United States Patent
Takami

(10) Patent No.: US 11,064,122 B2
(45) Date of Patent: Jul. 13, 2021

(54) IMAGE CAPTURE DEVICE, SYSTEM, METHOD FOR CONTROLLING IMAGE CAPTURE DEVICE, AND NON-TRANSITORY COMPUTER-READABLE STORAGE MEDIUM FOR DELETING REGION INFORMATION AND A SET VALUE OF PAN, TILT, AND ZOOM

(71) Applicant: CANON KABUSHIKI KAISHA, Tokyo (JP)

(72) Inventor: Shinjiro Takami, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/030,489

(22) Filed: Sep. 24, 2020

(65) Prior Publication Data
US 2021/0092303 A1 Mar. 25, 2021

(30) Foreign Application Priority Data
Sep. 25, 2019 (JP) .............................. JP2019-174539

(51) Int. Cl.
*H04N 5/232* (2006.01)

(52) U.S. Cl.
CPC ... *H04N 5/232935* (2018.08); *H04N 5/23296* (2013.01); *H04N 5/23299* (2018.08)

(58) Field of Classification Search
CPC ......... H04N 5/232935; H04N 5/23299; H04N 5/23296
See application file for complete search history.

(56) References Cited

U.S. PATENT DOCUMENTS

| | | |
|---|---|---|
| 5,838,368 A | 11/1998 | Masunaga et al. |
| 6,744,461 B1 | 6/2004 | Wada et al. |
| 7,961,953 B2 | 6/2011 | Itoh et al. |
| 10,638,050 B2 | 4/2020 | Lee |
| 10,848,685 B2 | 11/2020 | Yokomizo |

(Continued)

FOREIGN PATENT DOCUMENTS

JP 2001069494 A 3/2001

OTHER PUBLICATIONS

ONVIF, "Specification Map—Version 2.2.1" (Dec. 2012) pp. 1-2.
(Continued)

*Primary Examiner* — Nicholas G Giles
(74) *Attorney, Agent, or Firm* — Carter, DeLuca & Farrell LLP

(57) ABSTRACT

The present invention discloses an image capture device comprising, an image capture unit, an image-capture control unit for controlling PTZ, a storage unit for storing a set value of the PTZ, and region information that specifies a detection region for an object in a captured image, a reception unit for receiving a deletion instruction to delete the region information from an information processing device, and a processing unit for, when the deletion instruction to delete the region information is received by the reception unit, deleting, from the storage unit, the region information for which the deletion instruction has been received, and deleting the set value from the storage unit if the set value associated with the region information for which the deletion instruction has been received is not associated with another region information.

9 Claims, 16 Drawing Sheets

DETECTION RULE SETTING 500

| DETECTION RULE NAME | DETECTION REGION | PTZ PRESET token |
|---|---|---|
| RULE 1 | (x=-1.0,y=1.0), (x=-1.0,y=-1.0), (x=1.0,y=1.0), (x=1.0,y=-1.0) | token1 |
| RULE 2 | (x=-0.5,y=0.5), (x=-0.5,y=-0.5), (x=0.5,y=0.5), (x=0.5,y=-0.5) | token2 |
| RULE 3 | (x=-0.5,y=0.5), (x=-0.5,y=-0.5), (x=0.5,y=0.5), (x=0.5,y=-0.5) | token1 |

PTZ PRESET SETTING 510

| PRESET NAME | PTZ VALUE | DETECTION RULE | CREATOR |
|---|---|---|---|
| token1 | (p=p1), (t=t1), (z=z1) | RULE 1, RULE 3 | USER |
| token2 | (p=p2), (t=t2), (z=z2) | RULE 2 | MONITORING CAMERA |
| token3 | (p=p3), (t=t3), (z=z3) | | USER |

(56) References Cited

U.S. PATENT DOCUMENTS

| | | |
|---|---|---|
| 2004/0056964 A1 | 3/2004 | Kawai et al. |
| 2005/0046699 A1 | 3/2005 | Oya et al. |
| 2006/0104625 A1 | 5/2006 | Oya |
| 2008/0317356 A1 | 12/2008 | Itoh et al. |
| 2009/0175501 A1 | 7/2009 | Tahara |
| 2011/0235925 A1 | 9/2011 | Itoh et al. |
| 2012/0098854 A1* | 4/2012 | Ohnishi ........... H04N 5/232935 345/626 |
| 2014/0074977 A1* | 3/2014 | Niida ..................... H04N 5/772 709/217 |
| 2014/0118545 A1 | 5/2014 | Iwasaki |
| 2014/0198210 A1 | 7/2014 | Lee et al. |
| 2017/0041530 A1 | 2/2017 | Kimura |
| 2017/0041608 A1 | 2/2017 | Yokomizo |
| 2017/0302860 A1 | 10/2017 | Yokomizo |
| 2018/0227499 A1 | 8/2018 | Lee |
| 2018/0376078 A1 | 12/2018 | Adachi et al. |
| 2019/0052814 A1 | 2/2019 | Yonishi |
| 2019/0149744 A1 | 5/2019 | Fukunaga |
| 2020/0014854 A1 | 1/2020 | Katsunuma |
| 2020/0014856 A1 | 1/2020 | Asanuma et al. |
| 2020/0059595 A1 | 2/2020 | Ono |

OTHER PUBLICATIONS

ONVIF, PTZ Service Specification—Version 18.12 (Dec. 2018) pp. 1-50.
ONVIF, "Analytics Service Spec—Version 19.06" (Jun. 2019) pp. 1-57.
Extended European Search Report dated Jan. 28, 2021, for corresponding European Patent Application No. 20198090.1.
Notice of Allowance issued by the U.S. Patent and Trademark Office dated Apr. 9, 2021 in corresponding U.S. Appl. No. 17/030,415.

* cited by examiner

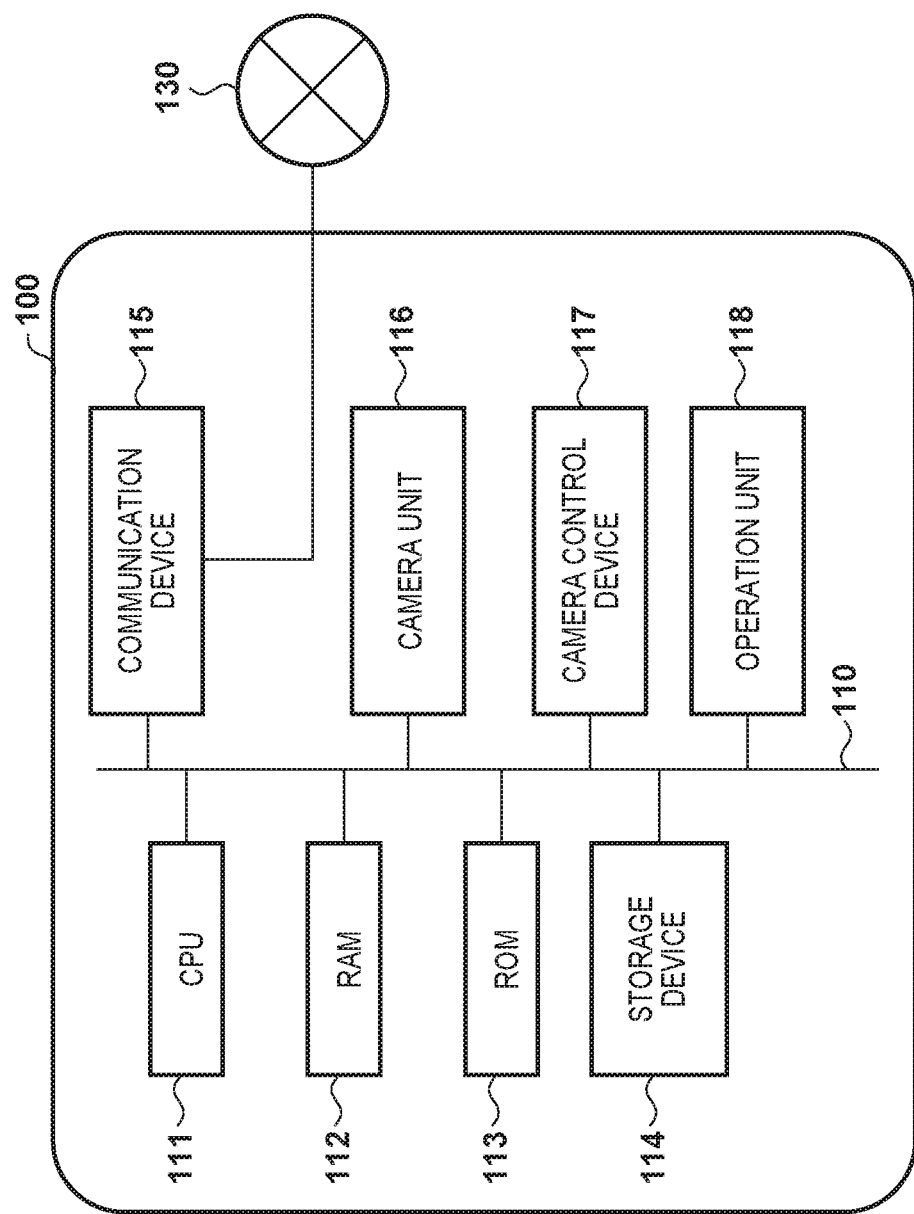

IMAGE CAPTURE DEVICE, SYSTEM, METHOD FOR CONTROLLING IMAGE CAPTURE DEVICE, AND NON-TRANSITORY COMPUTER-READABLE STORAGE MEDIUM FOR DELETING REGION INFORMATION AND A SET VALUE OF PAN, TILT, AND ZOOM

BACKGROUND OF THE INVENTION

Field of the Invention

The present disclosure relates to an image capture device, a system, a method for controlling an image capture device, and a non-transitory computer-readable storage medium.

Description of the Related Art

A monitoring camera with a pan-tilt-zoom (PTZ) mechanism is provided with a function of registering a PTZ position as a preset in accordance with an instruction from a user, and moving to the PTZ position registered as a PTZ preset in accordance with an instruction. Also, the monitoring camera is provided with a function of, for example, detecting an object in a captured image. The user can operate a user interface (UI) on a screen that displays an image received by an information processing device from the monitoring camera, and set a detection region that indicates a region to perform detection in the screen, and detection rules including a detection rule name or the like.

Japanese Patent Laid-Open No. 2001-69494 discloses a technology by which, when a region of a mask for privacy protection is set in an image captured by a monitoring camera, a mask region and a PTZ position that are designated with screen coordinates are transmitted to the monitoring camera, and the monitoring camera deals with the mask region as spatial coordinates based on the mask region and the PTZ position.

Also, in a monitoring camera that distributes a captured image to a client device, a command group is implemented to give instructions to change settings of the monitoring camera from an external information processing device, create, edit, and delete a preset, and give instructions to create, edit, and delete settings of detection rules including designation of a detection region. As an example of such a command group, one that is defined by a standard provided by ONVIF (Open Network Video Interface Forum) in the ONVIF Specification (http://www.onvif.org/specs/Doc-Map.html) is known.

It is conceivable that the technology disclosed in Japanese Patent Laid-Open No. 2001-69494 is applied, and when a detection rule is created or edited, a detection region that is designated with screen coordinates to detect an object is associated with a PTZ preset that includes a PTZ position, and the detection region is dealt with as spatial coordinates. In this case, even if the detection rule is deleted, when the PTZ preset associated with the detection rule remains in a storage device, an unnecessary PTZ preset may press a storage capacity and cause a problem.

SUMMARY OF THE INVENTION

When a PTZ preset command and a detection rule command are independently operated as in the case of ONVIF commands, only a detection rule can be deleted using a command for the detection rule, which is particularly a problem, and a technology for effectively prevent it is needed.

One aspect of exemplary embodiments relates to an image capture device comprising, an image capture unit, an image-capture control unit configured to control pan, tilt, and zoom (PTZ) when an image is captured by the image capture unit, a storage unit configured to store a set value of the PTZ for capturing an image of a predetermined region in an image-capture area of the image capture unit, and region information that specifies a detection region for detecting an object in a captured image, a reception unit configured to receive a deletion instruction to delete the region information from an information processing device, and a processing unit configured to, when the deletion instruction to delete the region information is received by the reception unit, delete, from the storage unit, the region information for which the deletion instruction has been received, and delete the set value from the storage unit if the set value associated with the region information for which the deletion instruction has been received is not associated with another region information.

Further features of the present invention will become apparent from the following description of exemplary embodiments (with reference to the attached drawings).

BRIEF DESCRIPTION OF THE DRAWINGS

FIG. 2C shows an example of a hardware configuration of the monitoring camera 100 according to an embodiment.

DESCRIPTION OF THE EMBODIMENTS

Figure 1:
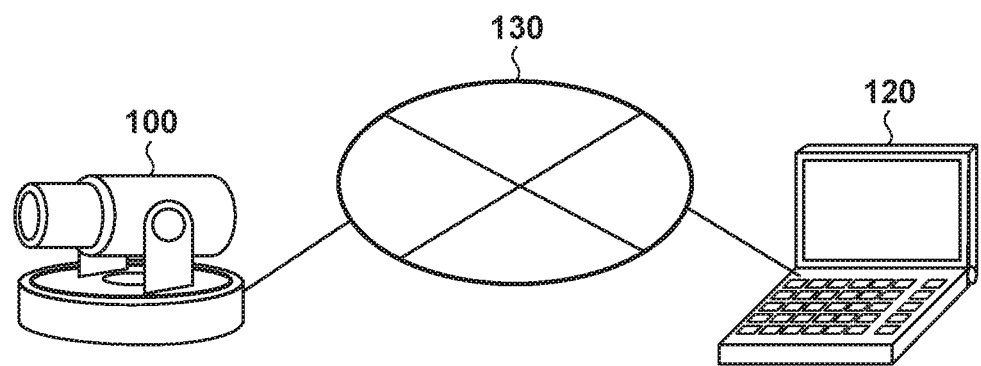
FIG. 1 shows an example of a system configuration including a configuration of a monitoring camera according to an embodiment.

Hereinafter, embodiments will be described in detail with reference to the attached drawings. Note that the following embodiments are not intended to limit the invention according to the claims. Although the embodiments describe a plurality of features, not all of these features are essentially for the invention, and the features may also be combined in any manner. Furthermore, in the attached diagrams, the same or similar constituents are assigned the same reference numerals, and redundant descriptions are omitted.

First Embodiment

A system configuration according to the present embodiment will be described below with reference to FIG. 1. FIG. 1 is a diagram showing an example of a system configuration including a monitoring camera 100. The monitoring camera 100 and a client device 120 are communicably connected to each other via a network 130. The client device 120 transmits, to the monitoring camera 100, control commands such as commands to give instructions of create, edit, and delete a PTZ preset, and commands to give instructions to create, edit, and delete a detection rule in object detection. The monitoring camera 100 creates, edits, and deletes a PTZ preset, and also creates, edits, and deletes a detection rule in accordance with the commands, and transmits responses to the commands to the client device 120.

The monitoring camera 100 is, for example, an image capture device that is installed in a monitoring target area, such as a convenience store, an apartment, an airport, a station building, a theater, a movie theater, or a stadium. The monitoring camera 100 can also be called a network camera, an image generation device, and an image communication device, or the like. The monitoring camera 100 is installed to capture an image of a predetermined region (monitoring region) in the monitoring target area, and has a function of distributing a captured image (moving image, still image) to the client device 120 via the network 130. The monitoring camera 100 has a PTZ (pan-tilt-zoom) control function, and may also have a platform (not shown) for control the pan and tilt. A configuration may also be employed in which a plurality of monitoring cameras 100 are prepared and separately installed to capture images of a plurality of monitoring regions in the monitoring target area.

The client device 120 is an information processing device that communicates with the monitoring camera 100 via the network 130 and controls operations of the monitoring camera 100. Alternatively, the client device 120 can also be called a camera control device, an image communication device, an image processing device, or the like. For example, the client device 120 can control the platform and make a request to change image quality settings, PTZ control, or the like. Also, the client device 120 transmits control commands such as the aforementioned PTZ preset command and detection rule command to the monitoring camera 100. The client device 120 receives, via the network 130, moving images and still images captured by the monitoring camera 100. The client device 120 can also function as an image analysis device (image processing device, image analysis device) that analyzes images captured by the monitoring camera 100, and can perform processing to, for example, detect and determine a person who is present in the monitoring region, and to count the number of people who have passed through a specific region (area or position) in the monitoring region. The client device 120 can be realized as an information processing device; for example, a personal computer, a server, a smartphone, a tablet, or the like. The client device 120 is not limited to being realized by a single device, and the functions thereof may be realized by a plurality of devices cooperating with each other.

Figure 2A:
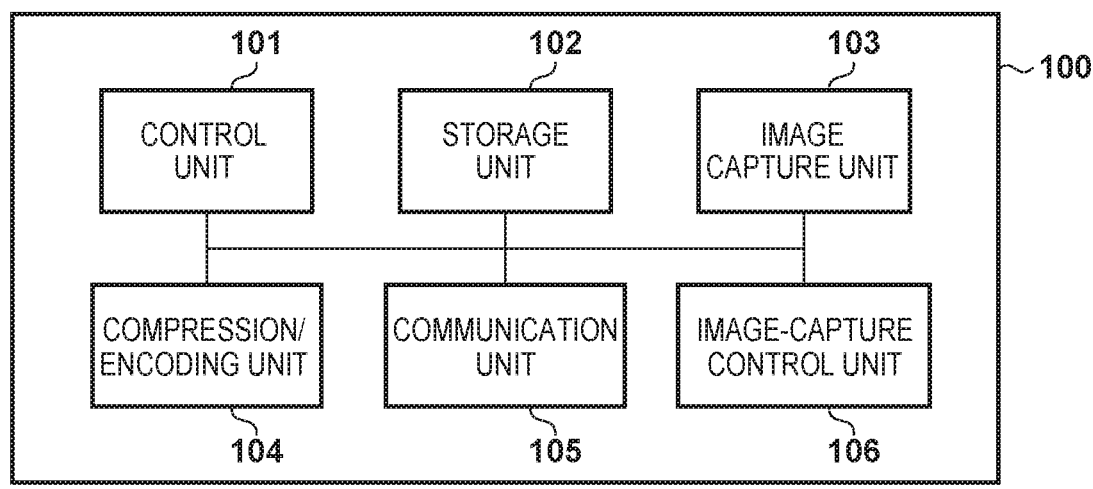
FIG. 2A shows an example of a functional configuration of a monitoring camera 100 according to an embodiment.

Next, an example of a functional configuration of the monitoring camera 100 will be described with reference to FIG. 2A. In FIG. 2A, a control unit 101 is constituted by a CPU, for example, and controls the entire monitoring camera 100. A storage unit 102 is mainly used as an area for storing various data, such as an area for storing programs to be executed by the control unit 101, a work area when a program is being executed, a set value storage area for settings of PTZ presets, detection rules, or the like, and an area for storing image data generated by a later-described image capture unit 103. The image capture unit 103 converts, to digital data, an analog signal that is acquired by capturing an image of an object formed by an imaging optical system of the monitoring camera 100, and outputs the digital data as a captured image to the storage unit 102. If a detection region for detecting an object is set for a captured image, the image capture unit 103 can output an image of the detection region of the captured image. Captured images may include a moving image and a still image. Upon a captured image being output to the storage unit 102, the control unit 101 receives an image acquisition event from the image capture unit 103.

A compression/encoding unit 104 perform processing to compress and encode a captured image output by the image capture unit 103 based on a format of JPEG, H.264, H.265, or the like to generate image data, and outputs the image data to the storage unit 102. A communication unit 105 is used when receiving control commands from an external device, and transmitting responses to control commands and images (image data stored in the storage unit 102) to an external device. If a command is received from an external device, the control unit 101 receives a command receipt event from the communication unit 105. An image-capture control unit 106 controls the platform for controlling the pan and tilt of the image capture unit 103 and controls zoom magnification in the imaging optical system in accordance with a value of the pan, tilt, or zoom that is input by the control unit 101, and performs control so as to capture an image of a desired region in the monitoring region.

Figure 2B:
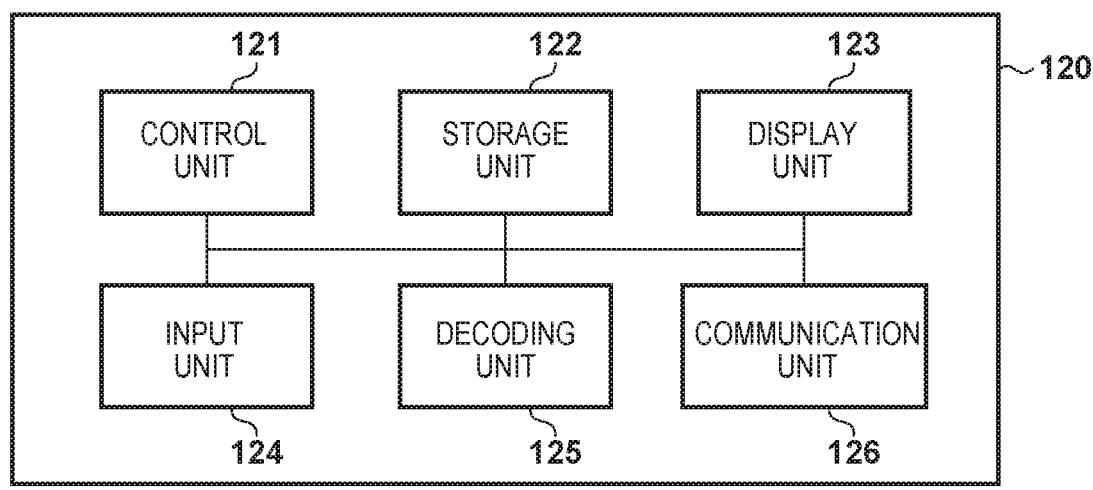
FIG. 2B shows an example of a functional configuration of a client device 120 according to an embodiment.

Next, an example of a functional configuration of the client device 120 will be described with reference to FIG. 2B. In FIG. 2B, a control unit 121 is constituted by a CPU, for example, and controls the entire client device 120. A storage unit 122 is mainly used as an area for storing various data, such as an area for storing programs to be executed by the control unit 121, and a work area when a program is being executed. A display unit 123 is constituted by, for example, an LCD, an organic EL display, or the like, and displays, to a user of the client device 120, a viewer screen for images (moving images, still images) received from the monitoring camera 100, a PTZ preset setting screen, a detection rule setting screen, various messages, and so on.

An input unit 124 is constituted by, for example, buttons, a keyboard, a touch panel, a mouse, or the like, and notifies the control unit 121 of the content of a screen operation performed by the user. A decoding unit 125 decodes compressed and encoded image data received via a communication unit 126 based on a format such as JPEG, H.264, or H.265, and extracts the image data in the storage unit 122. The communication unit 126 is used when control commands, such as commands to make requests to create, edit, acquire, and delete a PTZ preset, and commands to create, edit, delete, and acquire a detection rule for object detection are transmitted to the monitoring camera 100, and when responses to control commands and videos are received from the monitoring camera 100.

Although the functional configurations of the monitoring camera 100 and the client device 120 have been described above with reference to FIGS. 2A and 2B, the processing blocks shown here describe an example embodiment of the monitoring camera 100 and the client device 120, and this need not necessarily be the case. Various modifications and changes may be made within the scope of the gist of the present invention, and for example, an audio input unit and an audio output unit may also be provided.

Next, an example of a hardware configuration of the monitoring camera 100 will be described with reference to FIG. 2C. A CPU 111 is a device that comprehensively controls the monitoring camera 100 and computes and processes data, and can function as the control unit 101. The CPU 111 compresses and encodes a digital image signal output from a camera unit 116 and generates image data, and can also function as the compression/encoding unit 104. A RAM 112 is a volatile memory and is used as a temporary storage area such as a main memory, a work area, or the like of the CPU 111. A ROM 113 is a nonvolatile memory, and image data and other data, various programs for the CPU 111 to operate, and so on, are stored in respective predetermined areas. The CPU 111, for example, uses the RAM 112 as a work memory and controls each part of the monitoring camera 100 in accordance with a program stored in the ROM 113. Note that the programs for the CPU 111 to operate are not limited to being stored in the ROM 113, and may alternatively be stored in a storage device 114.

The storage device 114 is constituted by a magnetic disk such as an HDD or a flash memory, for example, and can function as the storage unit 102. The storage device 114 stores an application program, an OS, a control program, a related program, and so on. The storage device 114 can read and write data based on the control of the CPU 111. The storage device 114 may also be used in place of the RAM 112 and the ROM 113.

A communication device 115 is a communication interface for communication with the client device 120 via the network 130 based on the control of the CPU 111, and can function as the communication unit 105. The communication device 115 may include a wireless communication module, and this module may include any of known circuit mechanisms including an antenna system, an RF transceiver, one or more amplifiers, a tuner, one or more oscillators, a digital signal processor, a CODEC chip set, a subscriber identity module card, a memory, or the like. The communication device 115 may also include a wired communication module for wired connection. The wired communication module allows communication with other devices via one or more external ports. The communication device 115 may also include various software components for processing data. The external ports are coupled to other devices directly via the Ethernet, USB, IEEE1394, or the like, or indirectly via a network. Note that software that realizes functionalities equivalent to the above-described devices may replace hardware devices.

A camera unit 116 is constituted by an imaging optical system, an image sensor such as a CCD or a CMOS, a development processing unit, and so on, and can function as the image capture unit 103. The camera unit 116 captures an image of the monitoring region in the monitoring target area, which is a real space, and generates the image. The camera unit 116 converts an analog image signal obtained through photoelectric conversion using the image sensor such as a CCD or CMOS image sensor, to a digital image signal through A/D conversion. The camera unit 116 also performs development processing, such as DeBayer processing, white balance processing, and tone conversion processing, on the digital image signal, and outputs the processed signal to the CPU 111. For example, the camera unit 116 can acquire still images, and can also acquire images for a predetermined number of frames (e.g. 30 frames) per minute to acquire moving images (live video) at 30 fps of the monitoring region.

A camera control device 117 includes a platform for changing an image capturing direction, and a mechanism for changing settings for capturing an image, such as settings of zooming, focusing, and aperture, and functions as the image-capture control unit 106. An operation unit 118 is constituted by, for example, buttons, four-direction keys, a touch panel, or the like, and accepts operation input from the user.

Although FIG. 2C is shown as a hardware configuration diagram of the monitoring camera 100, the hardware configuration of the client device 120 may also conform to that in FIG. 2C. In this case, the camera unit 116 and the camera control device 117 are excluded from the configuration. The CPU 111 can also function as the decoding unit 125, and the operation unit 118 functions as the input unit 124 and may further include a keyboard, a mouse, and so on.

Figure 3:
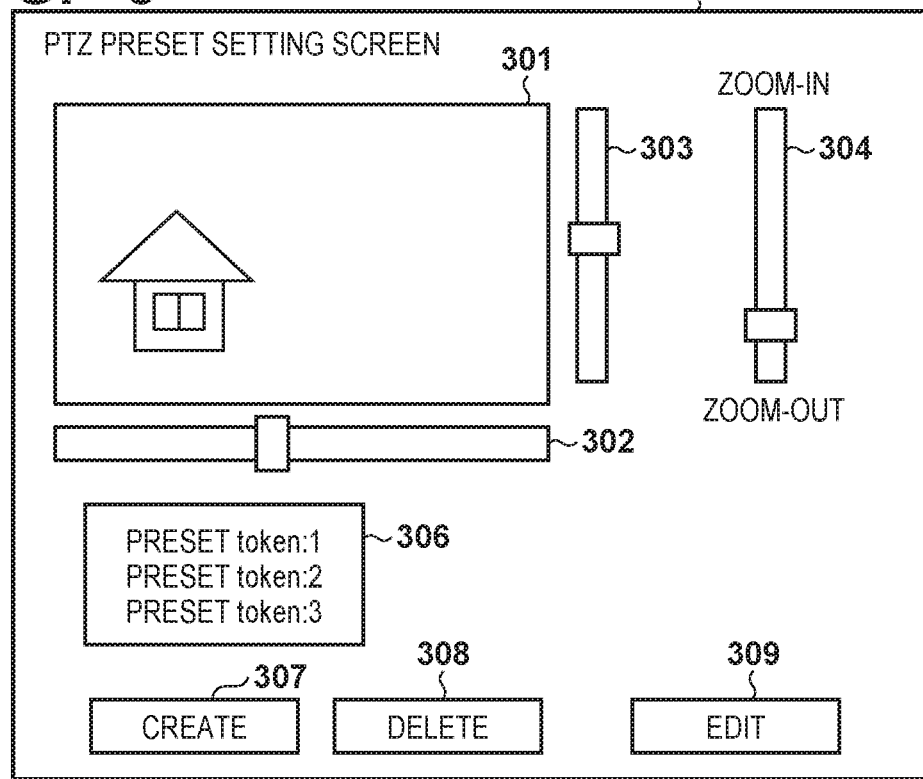
FIG. 3 shows an example of a PTZ preset setting screen according to an embodiment.

Next, a PTZ preset setting screen 300, which is displayed on the client device 120 according to the present embodiment, will be described with reference to FIG. 3. A display region 301 is a region for displaying an image received from the monitoring camera 100. The user operates a pan operation bar 302, a tilt operation bar 303, and a zoom operation bar 304 on the input unit 124 while viewing the display region 301 to adjust control values of the pan, tilt, and zoom of the monitoring camera 100 and determine image-capture conditions. In the present embodiment, an image-capture area (PTZ control area) that is specified by the ranges that can be taken by the pan, tilt, and zoom values corresponds to the monitoring region that is assigned to the monitoring camera 100 in the monitoring target area. By adjusting PTZ set values, the monitoring camera 100 can set image-capture conditions so as to capture an image of a desired region in the monitoring region in the image-capture area.

When a PTZ preset is created using PTZ set values that are currently displayed on the PTZ preset setting screen 300, the user presses a PTZ preset create button 307 through the input unit 124, and transmits a PTZ preset create command from the communication unit 126 to the monitoring camera 100. The PTZ preset create command can include designation of a preset name. Thus, a newly-generated PTZ preset setting is registered in a PTZ preset setting table 510 shown in FIG. 5. Upon a PTZ preset acquire command being transmitted from the communication unit 126 to the monitoring camera 100, the client device 120 receives a set value that is registered as a response to the command in the PTZ preset setting table 510, and displays a preset name in a PTZ preset setting list display area 306.

When a PTZ preset of the monitoring camera 100 is edited, the PTZ preset to be operated is selected from the PTZ preset setting list display area 306 on the input unit 124, and the pan operation bar 302, the tilt operation bar 303, and the zoom operation bar 304 are operated to operate the PTZ of the camera to a desired position. After the PTZ operation, an edit button 309 is pressed, and a PTZ preset edit command is transmitted from the communication unit 126 to the monitoring camera 100. Thus, in the monitoring camera 100, the set value to be edited, of the PTZ preset settings registered in the PTZ preset setting table 510, is updated.

When a PTZ preset setting of the monitoring camera 100 is deleted, the PTZ preset to be operated is selected from the PTZ preset setting list display area 306 on the input unit 124, a delete button 308 is pressed, and a PTZ preset delete command is transmitted from the communication unit 126 to the monitoring camera 100. Thus, in the monitoring camera 100, the set value to be deleted, of the PTZ preset settings registered in the PTZ preset setting table 510, is deleted from the table.

Figure 4:
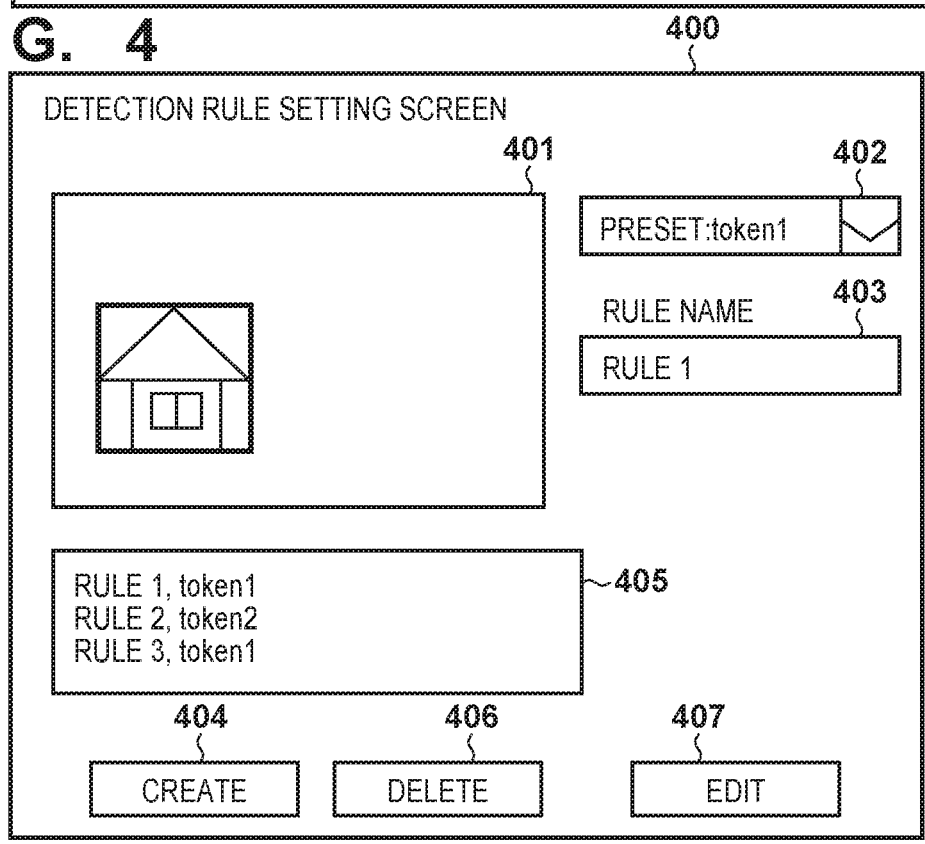
FIG. 4 shows an example of a detection rule setting screen according to an embodiment.

A detection rule setting screen 400 of the client device 120 according to the present embodiment will be described with reference to FIG. 4. A detection region setting area 401 is a region for displaying an image received from the monitoring camera 100 and a detection region, and enables a detection region to be set. The user designates a plurality of points in the detection region setting area 401 using the input unit 124, and a polygon that connects these points is set as a detection region. The detection region is specified by screen coordinates of the designated points. Furthermore, to set the detection region with spatial coordinates, the user can select a PTZ preset in a list box 402 for selecting PTZ preset settings that are set to the monitoring camera 100, using the input unit 124.

The user inputs a rule name to a text box 403 for inputting a rule name for identifying a detection rule, presses a create button 404, and transmits a detection rule create command from the communication unit 126 to the monitoring camera 100. Thus, a newly-generated detection rule setting is registered in a detection rule setting table 500 shown in FIG. 5. Upon transmitting a detection rule acquire command from the communication unit 126 to the monitoring camera 100, the client device 120 receives, as responses to the command, set values registered in the detection rule setting table 500, and displays a detection rule name in a detection rule setting list display area 405.

When a detection rule setting of the monitoring camera 100 is edited, a detection rule to be operated is selected from the detection rule setting list display area 405 on the input unit 124, the detection rule is edited by operating the detection region setting area 401, the PTZ preset selection list box 402, and rule name text box 403, then the edit button 407 is pressed, and a detection rule edit command is transmitted from the communication unit 126 to the monitoring camera 100. Thus, in the monitoring camera 100, the set value to be edited, of the detection rule settings registered in the detection rule setting table 500, is updated.

When a detection rule setting of the monitoring camera 100 is deleted, a detection rule to be operated is selected from the detection rule setting list display area 405 on the input unit 124, a delete button 406 is pressed, and a detection rule delete command is transmitted from the communication unit 126 to the monitoring camera 100. Thus, in the monitoring camera 100, the set value to be deleted, of the detection rule settings registered in the detection rule setting table 500, is deleted from the table.

Figure 5:
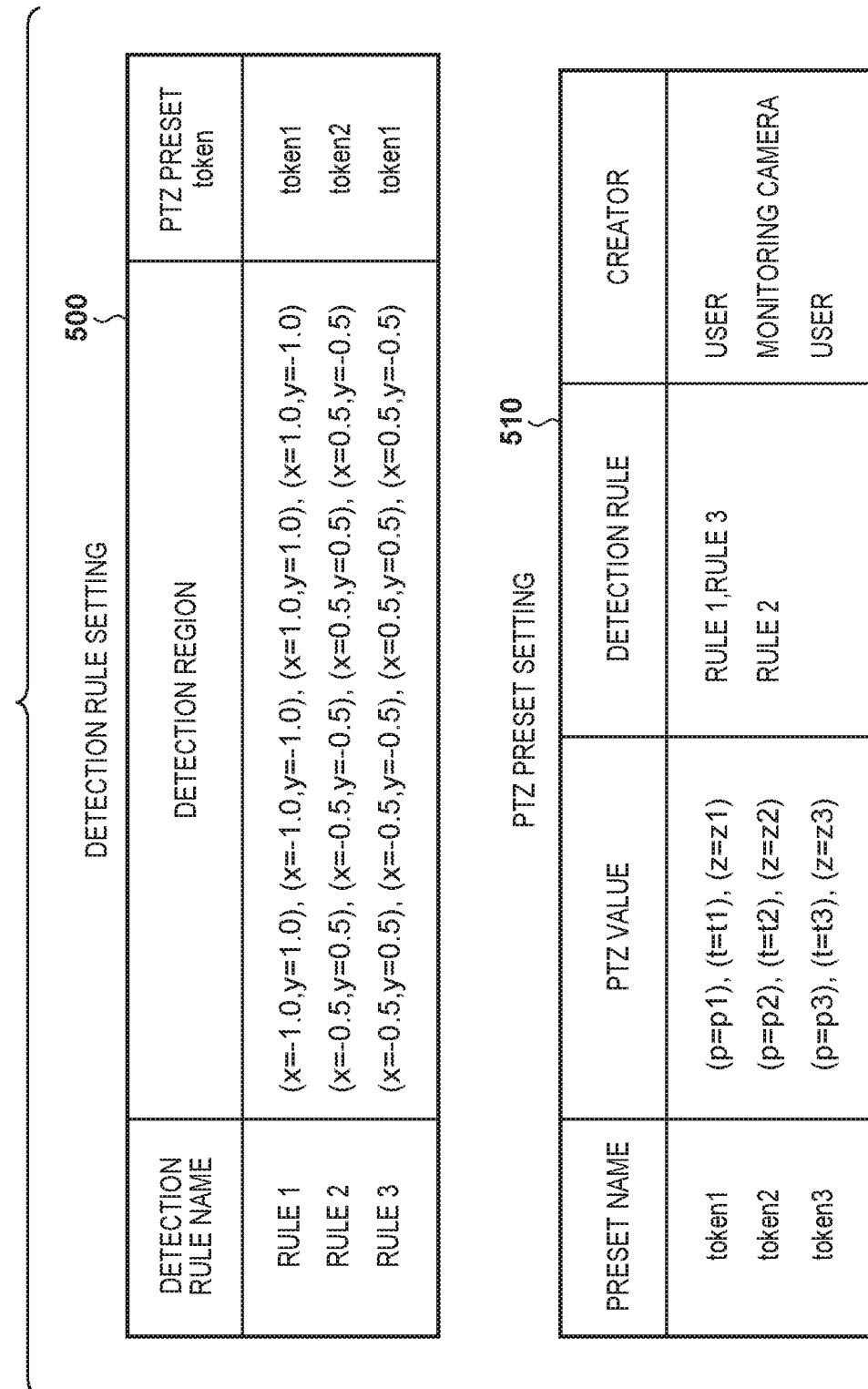
FIG. 5 shows a table showing an example of detection rule settings and a table showing an example of PTZ preset settings according to an embodiment.

The detection rule settings and the preset settings in the monitoring camera 100 according to the present embodiment will be described with reference to FIG. 5. FIG. 5 is a table showing an example of a data structure of the detection rule settings. The detection rule setting table 500 held by the monitoring camera 100 is configured to include a detection rule name that identifies each detection rule, region information for specifying each detection region, and information for specifying a PTZ preset that is associated with each detection rule. The detection rule setting table 500 is stored in the storage unit 102.

The region information for specifying a detection region is coordinates for specifying an area occupied by the detection region in a screen (e.g. the detection region setting area 401 in FIG. 4) that displays an image, or in a captured image. If the detection region has a rectangular shape, the detection region may be specified by the coordinates of four vertexes, or may be specified by the coordinates of two vertexes that diagonally oppose each other. In the case of a polygon other than a rectangle, the detection region can be specified by the coordinates of the vertexes thereof.

By combining the PTZ preset information with the detection region information, a detection region defined by screen coordinates can be converted to a detection region defined by spatial coordinates as a desired region in the monitoring region in the PTZ control area. Further, by referencing registered values of a PTZ preset, an associated PTZ preset and the presence thereof can be determined for each detection rule.

FIG. 5 is a table showing an example of a data structure of the PTZ preset settings. The preset setting table 510 held by the monitoring camera 100 is configured to include a preset name that identifies each preset setting, PTZ set values, a detection rule name for which each PIZ preset is set, and information representing a preset creator. The PTZ preset setting table 510 is stored in the storage unit 102.

The PTZ set values are used as control values for controlling the pan, tilt and zoom in the image-capture control unit 106 in order to capture an image of a desired region in the monitoring region in the PTZ control area. Since a detection rule name, which is associated with each PTZ preset setting, is registered for each detection rule, it can be determined whether or not each of the PTZ presets is set for a detection rule.

When a user newly creates a preset using the preset setting screen 300, this user is the preset creator. On the other hand, if the user does not designate a preset when setting a detection rule, and a preset is created on the monitoring camera 100 side, the monitoring camera is the preset creator. Accordingly, there are two types of PTZ presets in the present embodiment; namely, a first PTZ preset that is generated in accordance with an instruction to create a PTZ preset, and a second PTZ preset that is created in accordance with an instruction to create a detection rule. The creator information may be, for example, flag information that is 0 or 1, and may be 1 when the user is the creator, and 0 when the monitoring camera 100 is the creator, or vice versa. In this case, whether or not the creator is the monitoring camera 100 can be determined by checking the flag value.

Next, a description will be given, with reference to FIG. 6, of a sequence in which the monitoring camera 100 according to the present embodiment sends a detection rule create or edit command and a PTZ preset delete command to the client device 120. The client device 120 transmits, from the communication unit 126, a PTZ preset create or edit command to create or edit a PTZ preset to be set for a detection rule. Upon receiving the command at the communication unit 105, the monitoring camera 100 causes the control unit 101 to create or edit a PTZ preset at the current PTZ position and update the PTZ preset setting table 510. Furthermore, the monitoring camera 100 transmits, from the communication unit 105, a PTZ preset token that identifies the created or edited PTZ preset. The client device 120 receives the PTZ preset token at the communication unit 126.

To create or edit the detection rule, the client device 120 transmits, from the communication unit 126, a detection rule create or edit command with designation of a detection rule name, a detection region as screen coordinates, and the PTZ preset token. The monitoring camera 100 receives the command at the communication unit 105, and causes the control unit 101 to create or edit the detection rule and update the detection rule setting table 500. Furthermore, the monitoring camera 100 transmits the results of the detection rule create or edit command from the communication unit 105. The client device 120 receives the command result at the communication unit 126.

To delete the PTZ preset, the client device 120 designates a PTZ preset token and transmits PTZ preset delete command from the communication unit 126. Here, a command related to a PTZ preset and a command related to a detection rule can be issued independently of each other. Accordingly, the client device 120 can issue a PTZ preset delete command to the monitoring camera 100 regardless of whether or not the PTZ preset is associated with any detection rule. The monitoring camera 100 receives the command at the communication unit 105, and causes the control unit 101 to perform PTZ preset deletion processing 601 corresponding to the present embodiment, and update the registered content of the PTZ preset setting table 510. Furthermore, the monitoring camera 100 transmits the result of the PTZ delete command from the communication unit 105. The client device 120 receives the command result at the communication unit 126.

Figure 6:
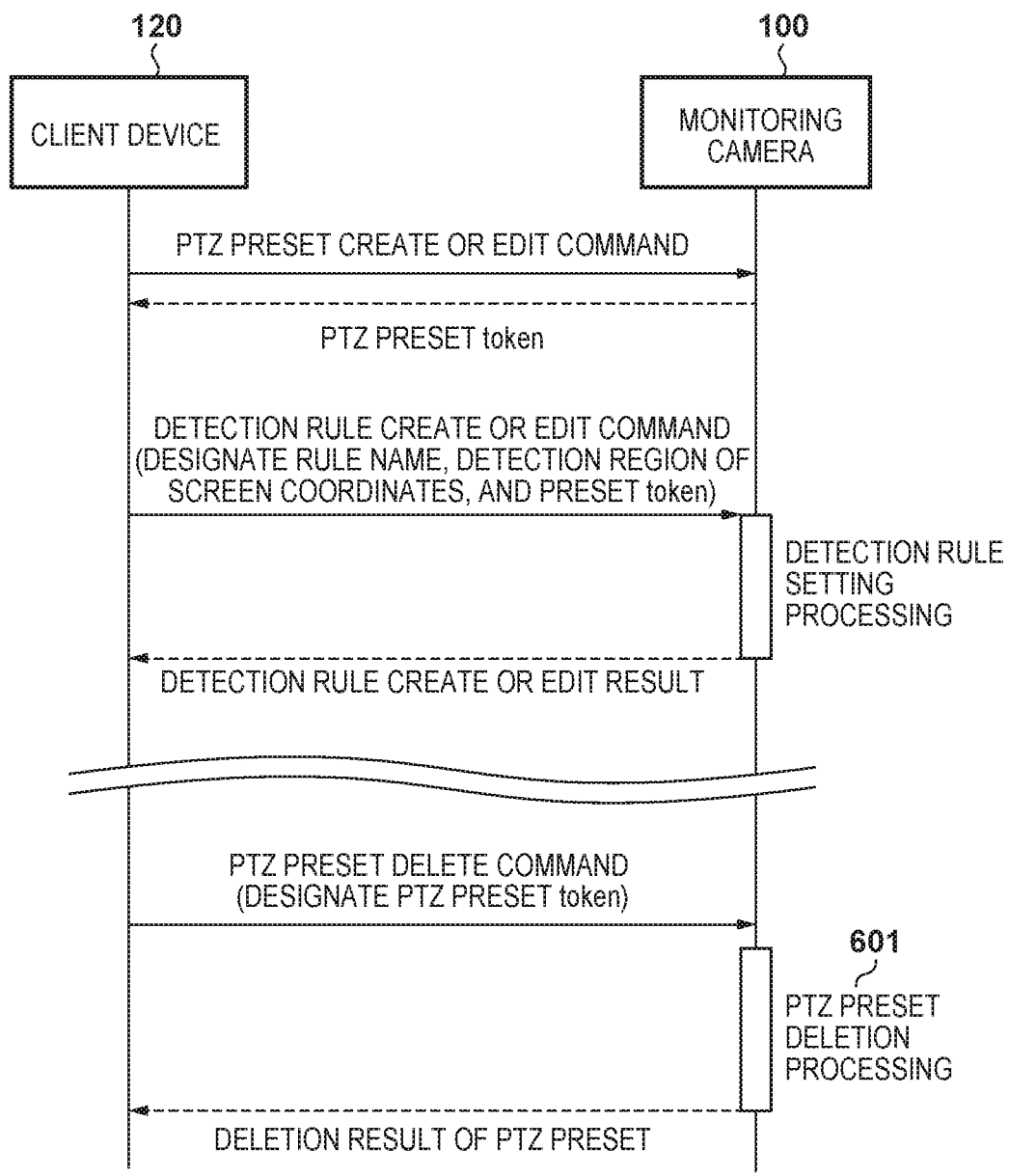
FIG. 6 is a sequence chart showing an example of communication and processing performed between the monitoring camera 100 and the client device 120 according to an embodiment.

In FIG. 6, the protocol of these commands may be, for example, the ONVIF, an original control protocol of the monitoring camera, or the like, and is not limited to being of a specific type.

Figure 7:
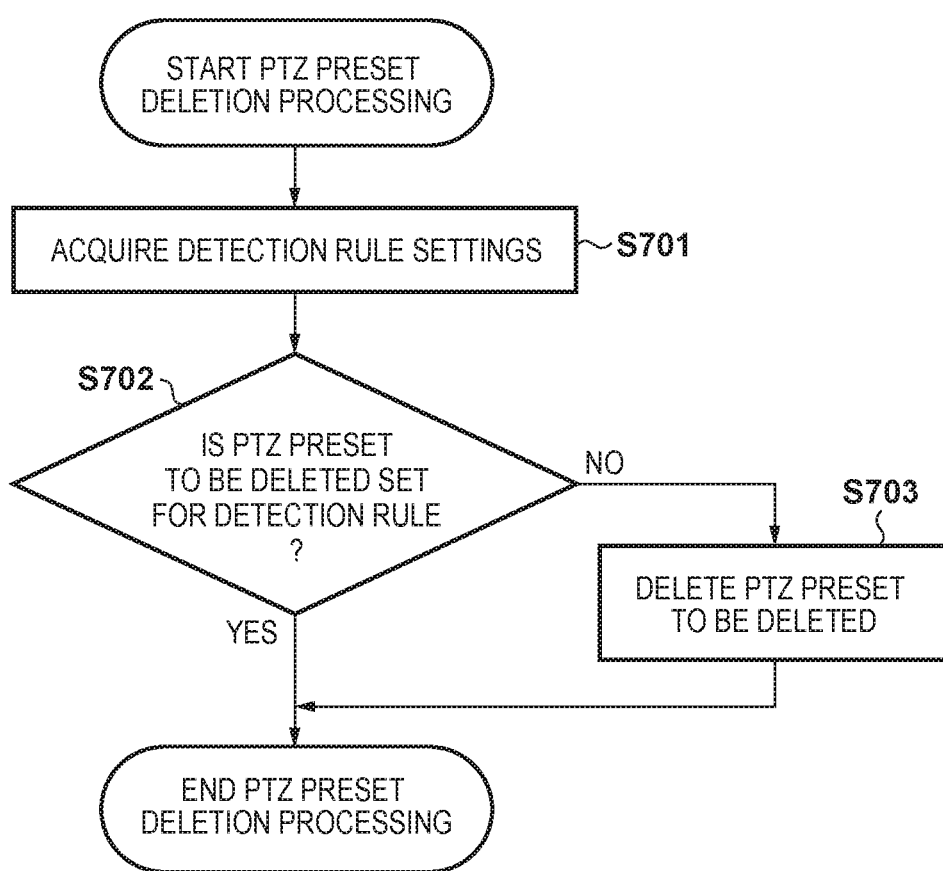
FIG. 7 is a flowchart showing an example of PTZ preset deletion processing performed by the monitoring camera 100 according to an embodiment.

The PTZ preset deletion processing 601 performed by the monitoring camera 100 according to the present embodiment will be described with reference to FIG. 7. Firstly, in step S701, the control unit 101 of the monitoring camera 100 acquires information regarding detection rule settings from the detection rule setting table 500 stored in the storage unit 102. In the following step S702, the control unit 101 of the monitoring camera 100 determines whether or not the PTZ preset to be deleted is set for a detection rule; in other words, whether or not the PTZ preset to be deleted is associated with any detection rule. If the PTZ preset to be deleted is associated with any detection rule, the control unit 101 does not delete the PTZ preset to be deleted, and the processing ends. On the other hand, if the PTZ preset to be deleted is not associated with any detection rule, the processing proceeds to step S703. In step S703, the control unit 101 of the monitoring camera 100 deletes the PTZ preset to be deleted in the PTZ preset setting table 510 stored in the storage unit 102, and the processing ends.

Note that if, in step S702, the PTZ preset to be deleted is associated with any detection rule, the client device 120 may be notified that the PTZ preset to be deleted was not deleted.

In this case, the control unit 101 of the monitoring camera transmits, to the client device 120, information regarding the PTZ preset that was not deleted, and information regarding the detection rule associated with this PTZ preset. Then, the control unit 121 of the client device 120 displays, on the display unit 123, both information regarding the PTZ preset and information regarding the detection rule associated with this PTZ preset that are received from the monitoring camera 100. Further, the client device 120 displays, on the display unit 123, a message that makes the user recognize that the PTZ preset was not deleted due to the presence of the detection rule associated with the PTZ preset. By displaying the message, the user can recognize the fact that the PTZ preset was not deleted, and the reason therefor. The user can then determine whether to cancel the deletion of the PTZ preset or to delete the detection rule associated with the PTZ preset and then delete the PTZ preset again.

As described above, in the present embodiment, the monitoring camera 100, when receiving a PTZ preset delete command, determines whether or not to delete the PTZ preset based on whether or not the PTZ preset to be deleted is associated with any detection rule. This configuration can prevent erroneous deletion of a preset that is associated with a detection rule through a preset operation.

Second Embodiment

Next, a second embodiment of the invention will be described. The system configuration, the functional configuration, and the hardware configuration in the present embodiment are the same as those described in the first embodiment, and a description thereof is omitted accordingly.

Figure 8:
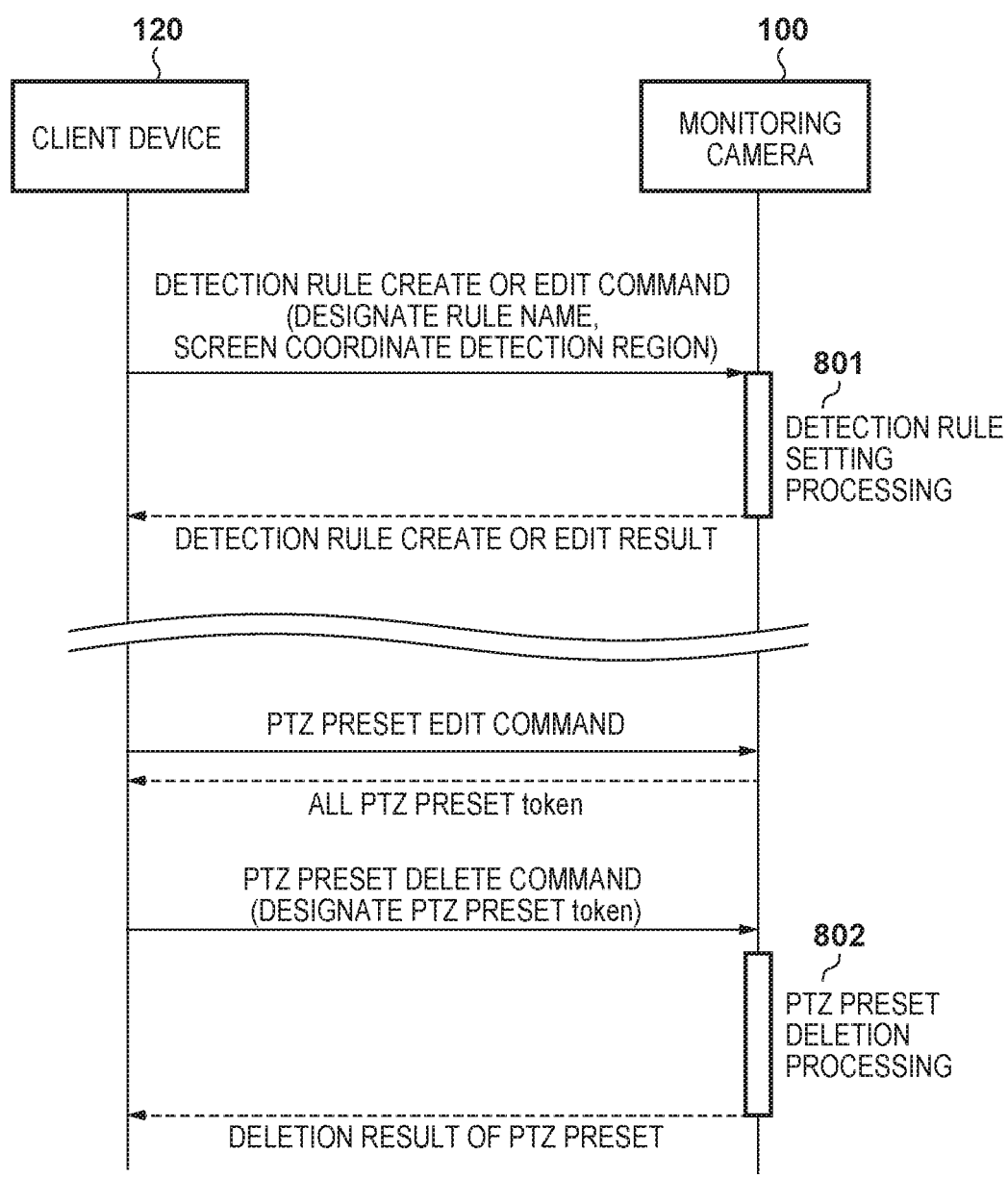
FIG. 8 is a sequence chart showing another example of communication and processing performed between the monitoring camera 100 and the client device 120 according to an embodiment.

FIG. 8 shows a sequence in which the monitoring camera 100 according to the present embodiment sends a detection rule create or edit command and a PTZ preset delete command to the client device 120.

To create or edit the detection rule, the client device 120 transmits, from the communication unit 126, a detection rule create or edit command with designation of a detection rule name and a detection region as screen coordinates. Upon receiving the command at the communication unit 105, the monitoring camera 100 causes the control unit 101 to perform detection rule setting processing 801 and update the detection rule setting table 500. Furthermore, the monitoring camera 100 transmits the result of the detection rule create or edit command from the communication unit 105. The client device 120 receives the command result at the communication unit 126.

To perform a PTZ preset operation, the client device 120 transmits a PTZ preset acquire command from the communication unit 126. The monitoring camera 100 receives the command at the communication unit 105, and causes the control unit 101 to transmit all of the PTZ preset tokens that are currently set in the PTZ preset setting table 510 stored in the storage unit 102 from the communication unit 105. The client device 120 receives the PTZ preset token at the communication unit 126.

To delete the PTZ preset, the client device 120 designates a PTZ preset token and transmits PTZ preset delete command from the communication unit 126. The monitoring camera 100 receives the command at the communication unit 105, and causes the control unit 101 to perform PTZ preset deletion processing 802 and update the PTZ preset setting table 510. Furthermore, the monitoring camera 100 transmits the result of the PTZ delete command from the communication unit 105. The client device 120 receives the command result at the communication unit 126.

In FIG. 8, the protocol of these commands may be, for example, the ONVIF, an original control protocol of the monitoring camera, or the like, and is not limited to being of a specific type.

The detection rule setting processing 801 performed by the monitoring camera 100 according to the present embodiment will be described with reference to FIG. 9. Firstly, in step S901, the control unit 101 of the monitoring camera 100 determines whether or not the detection rule create or edit command received from the client device 120 includes designation of a PTZ preset. If a PTZ preset is not designated, the processing proceeds to step S902. If a PTZ preset is designated, the processing proceeds to step S904.

In step S902, the control unit 101 of the monitoring camera 100 creates a PTZ preset at the current PTZ position (at this point in time), adds information indicating that the monitoring camera 100 has created the PTZ preset as a creator set value, and updates the PTZ preset setting table 510 stored in the storage unit 102. Then, the processing proceeds to step S903. In step S903, the control unit 101 of the monitoring camera 100 sets a detection rule based on the detection rule name and the screen coordinates of the detection region that are designated by the client, as well as the PTZ preset token created by the monitoring camera 100 in step S902, and updates the detection rule setting table 500 stored in the storage unit 102, and then the processing ends.

In step S904, the control unit 101 of the monitoring camera 100 sets a detection rule based on the rule name and the screen coordinates of the detection region that are designated by the client, as well as the PTZ preset token, and updates the detection rule setting table 500 stored in the storage unit 102, and then the processing ends.

Figure 10:
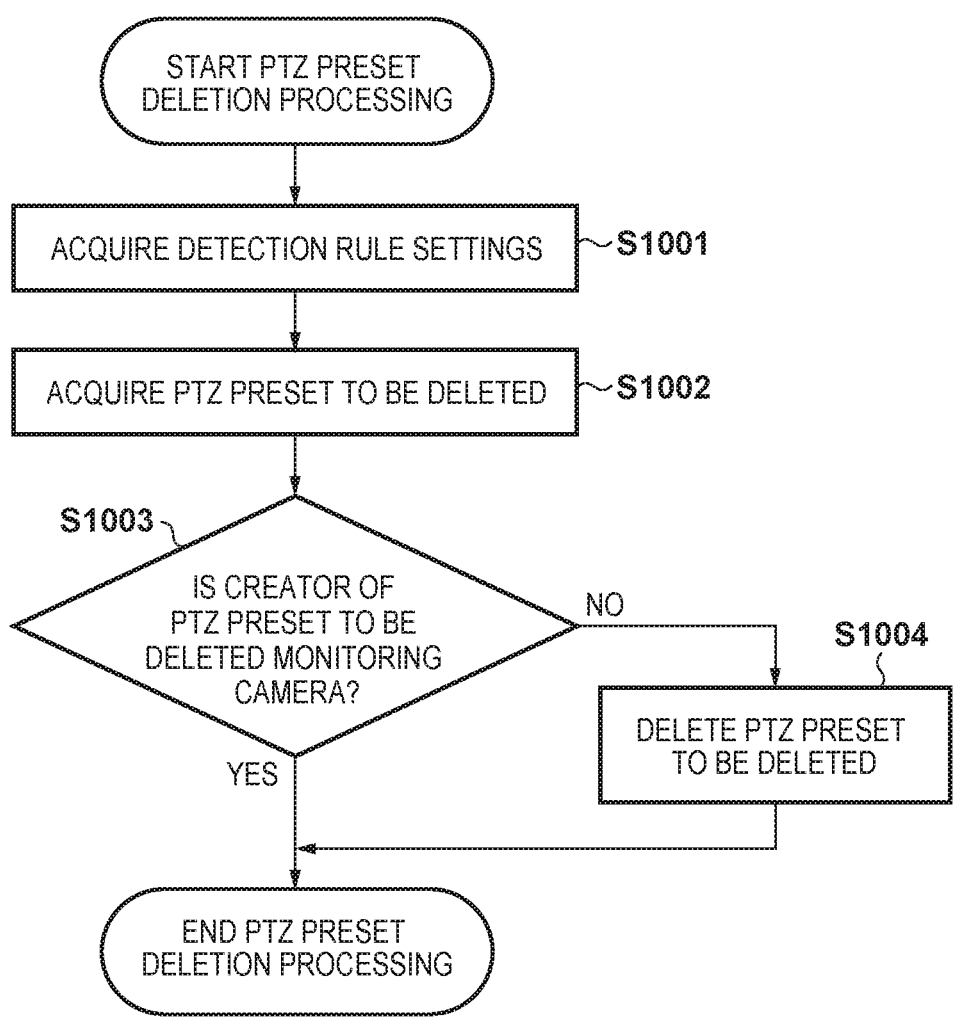
FIG. 10 is a flowchart showing an example of PTZ preset deletion processing performed by the monitoring camera 100 according to an embodiment.

Next, the PTZ preset deletion processing 802 performed by the monitoring camera 100 according to the present embodiment will be described with reference to FIG. 10. In step S1001, the control unit 101 of the monitoring camera 100 acquires information regarding detection rule settings from the detection rule setting table 500 stored in the storage unit 102. In the following step S1002, the control unit 101 of the monitoring camera 100 acquires information regarding the PTZ preset to be deleted from the PTZ preset setting table 510 stored in the storage unit 102. In the following step S1003, the control unit 101 of the monitoring camera 100 determines whether or not the PTZ preset to be deleted has been created by the monitoring camera 100, based on the creator set value of this PTZ preset. If the PTZ preset to be deleted has been created by the monitoring camera 100, the PTZ preset to be deleted is not deleted, and the processing ends. If the PTZ preset to be deleted has not been created by the monitoring camera 100, the processing proceeds to step S1004. In step S1004, the control unit 101 of the monitoring camera 100 deletes the PTZ preset to be deleted from the PTZ preset setting table 510 stored in the storage unit 102, and the processing ends.

The PTZ preset deletion processing 802 in FIG. 10 may be performed independently of, or in addition to, the PTZ preset deletion processing 601 described with reference to FIG. 7 in the first embodiment.

Figure 9:
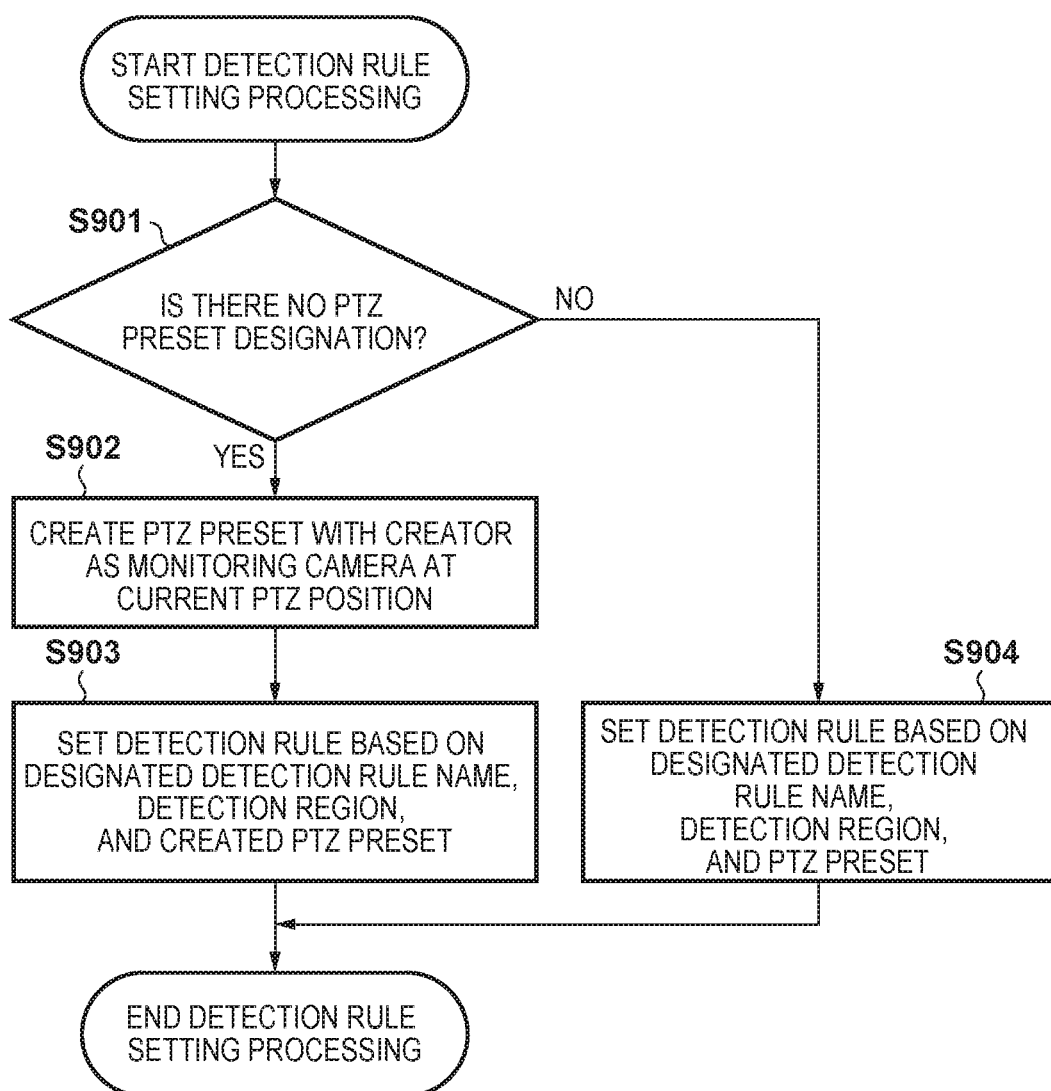
FIG. 9 is a flowchart showing an example of detection rule setting processing performed by the monitoring camera 100 according to an embodiment.

In the present embodiment, a preset created by the monitoring camera 100 is created, in principle, in association with a detection rule, as described in relation to FIG. 9. Accordingly, whether or not the PTZ preset is associated with a detection rule can be indirectly determined by referencing the creator of the PTZ preset to determine whether or not to delete a PTZ preset, without referencing a registered value of the PTZ preset in the detection rule setting table 500 as in the first embodiment.

As described above, in the present embodiment, when the monitoring camera 100 receives a PTZ preset delete command, a PTZ preset that is set for a detection rule through a preset operation can be prevented from being erroneously deleted, by determining whether or not to delete the PTZ preset to be deleted based on whether or not the preset has been created by the monitoring camera 100.

Third Embodiment

Next, a third embodiment of the invention will be described. The system configuration, the functional configuration, and the hardware configuration in the present embodiment are the same as those described in the first embodiment, and a description thereof is omitted accordingly.

In the present embodiment, user authentication information such as a user name and a password is added to commands such as a PTZ preset delete command transmitted from the client device 120 to the monitoring camera 100, and the monitoring camera 100 determines whether or not to execute each command based on the authentication information.

Figure 11:
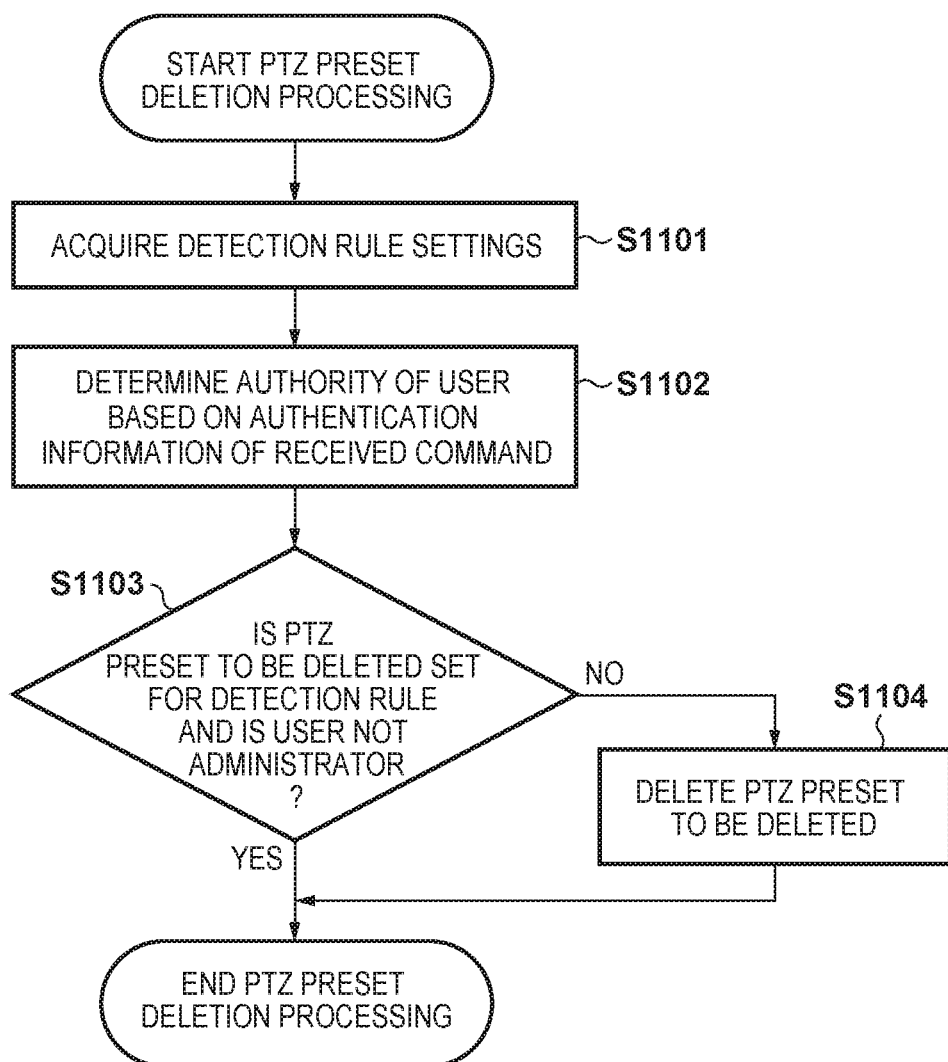
FIG. 11 is a flowchart showing an example of PTZ preset deletion processing performed by the monitoring camera 100 according to an embodiment.

The PTZ preset deletion processing 601 performed by the monitoring camera 100 according to the present embodiment will be described below with reference to FIG. 11. In step S1101, the control unit 101 of the monitoring camera 100 acquires information regarding detection rule settings from the detection rule setting table 500 stored in the storage unit 102. In the following step S1102, the control unit 101 of the monitoring camera 100 determines the authority of the user based on the authentication information included in the command received from the client device 120. Although the present embodiment envisions an administrator user who has an administrator's authority and a general user who does not have the administrator's authority, the user authority may be further segmented. The user name and password of an administrator are stored in the storage unit 102 of the monitoring camera 100, and the control unit 101 can determine whether or not the user is the administrator by checking the acquired authentication information against the stored user name and password.

In the following step S1103, the control unit 101 of the monitoring camera 100 determines whether or not a condition is matched that the PTZ preset to be deleted is set for any detection rule and the authority of the user who issued the delete command is not the administrator. If the above condition is matched, the processing ends without deleting the PTZ preset to be deleted. On the other hand, if the PTZ preset to be deleted is not set for any detection rule, or the user authority is the administrator, the above condition is not matched, and thus, the processing proceeds to step S1104. In step S1104, the control unit 101 of the monitoring camera 100 deletes the PTZ preset to be deleted from the PTZ preset setting table 510 stored in the storage unit 102, and the processing ends.

As described above, in the present embodiment, when the monitoring camera 100 receives a PTZ preset delete command, whether or not to delete the PTZ preset is determined based on whether or not the PTZ preset to be deleted is set for any detection rule, and the user authority of the user who issued the PTZ preset delete command. This configuration

Fourth Embodiment

Next, a fourth embodiment of the invention will be described. The system configuration, the functional configuration, and the hardware configuration in the present embodiment are the same as those described in the first embodiment. The content of the sequence processing and the detection rule setting processing 801 performed between the monitoring camera 100 and the client device 120 is the same as that described with reference to FIGS. 8 and 9 in the second embodiment, and a description thereof is omitted accordingly.

In the present embodiment, user authentication information such as a user name and a password is added to commands, such as a PTZ preset delete command, transmitted from the client device 120 to the monitoring camera 100, and the monitoring camera 100 determines whether or not to execute each command based on the authentication information.

Figure 12:
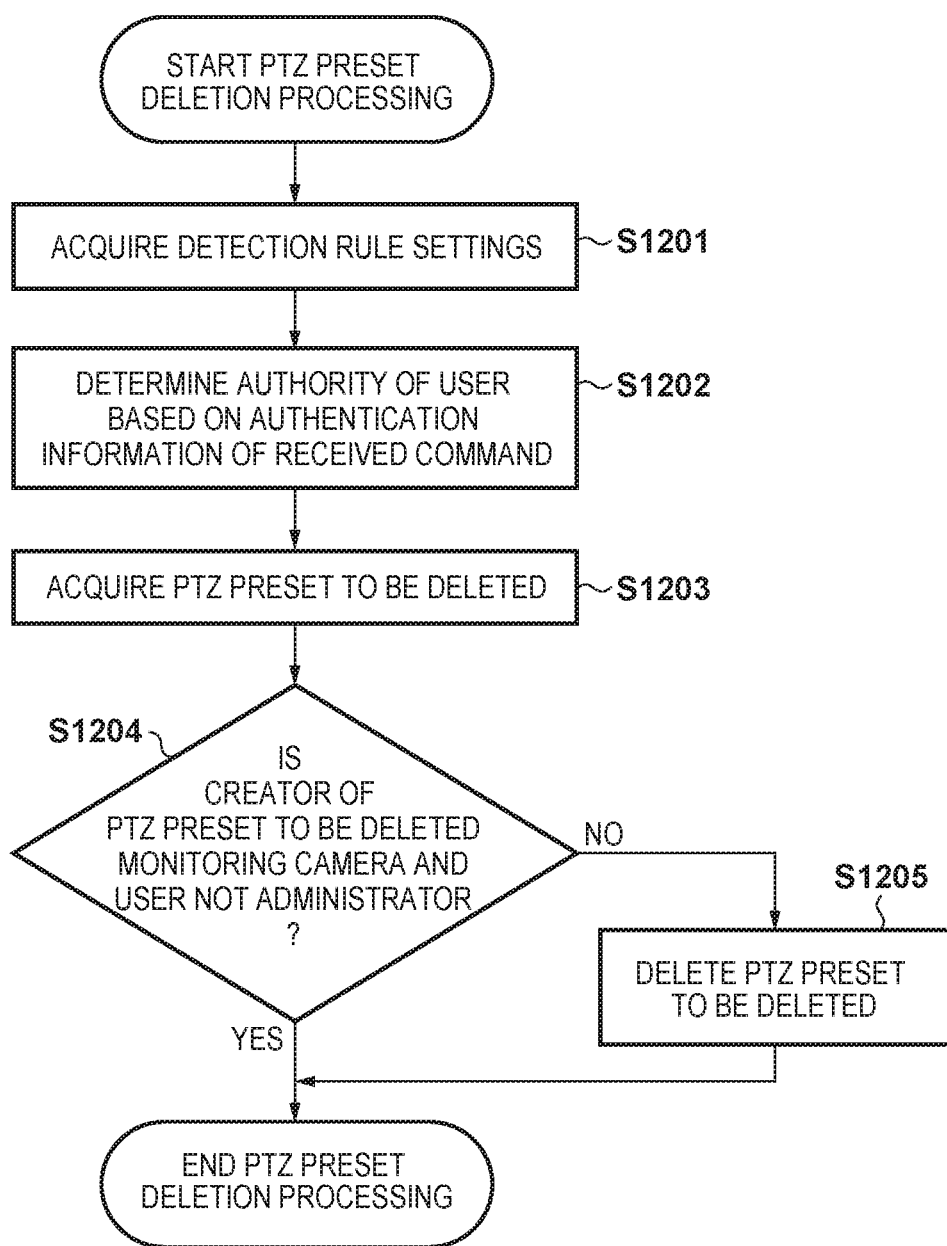
FIG. 12 is a flowchart showing an example of PTZ preset deletion processing performed by the monitoring camera 100 according to an embodiment.

The PTZ preset deletion processing 802 performed by the monitoring camera 100 according to the present embodiment will be described below with reference to FIG. 12. In step S1201, the control unit 101 of the monitoring camera 100 acquires information regarding detection rule settings from the detection rule setting table 500 stored in the storage unit 102. In the following step S1202, the control unit 101 of the monitoring camera 100 determines the authority of the user, based on the authentication information included in the command received from the client device 120. The detail of authority determination is the same as the content described in relation to step S1102 in FIG. 11 in the third embodiment, and a description thereof will be omitted accordingly.

In the following step S1203, the control unit 101 of the monitoring camera 100 acquires information regarding the PTZ preset to be deleted from the PTZ preset setting table 510 stored in the storage unit 102. In the following step S1204, the control unit 101 of the monitoring camera 100 determines whether or not a condition is matched that the creator of the PTZ preset to be deleted is the monitoring camera and the authority of the user who issued the delete command is not the administrator. If the above condition is matched, the processing ends without deleting the PTZ preset to be deleted. On the other hand, if the creator of the PTZ preset to be deleted is not the monitoring camera, or the authority of the user who issued the delete command is the administrator, the above condition is not matched, and thus, the processing proceeds to step S1205. In step S1205, the control unit 101 of the monitoring camera 100 deletes the PTZ preset to be deleted from the PTZ preset setting table 510 stored in the storage unit 102, and the processing ends.

As described above, in the fourth embodiment, when the monitoring camera 100 receives a PTZ preset delete command, whether or not to delete the PTZ preset is determined based on whether or not the PTZ preset to be deleted has been created by the monitoring camera 100, and the user authority of the user who issued the PTZ preset delete command. This configuration can prevent erroneous deletion of a preset that is set for a detection rule through a preset operation.

Fifth Embodiment

Next, a fifth embodiment of the invention will be described. The system configuration, the functional configuration, and the hardware configuration in the present embodiment are the same as those described in the first embodiment, and a description thereof is omitted accordingly.

A description will be given below, with reference to FIG. 13, of a sequence in which the monitoring camera 100 according to the present embodiment sends a detection rule create command and a detection rule delete command to the client device 120. The client device 120 transmits, from the communication unit 126, a PTZ preset create or edit command to create or edit a PTZ preset to be set for a detection rule. Upon receiving the command at the communication unit 105, the monitoring camera 100 causes the control unit 101 to create or edit a PTZ preset at the current PTZ position and update the PTZ preset setting table 510. Furthermore, the monitoring camera 100 transmits, from the communication unit 105, a PTZ preset token that identifies the created or edited PTZ preset. The client device 120 receives the PTZ preset token at the communication unit 126.

To create or edit the detection rule, the client device 120 transmits, from the communication unit 126, a detection rule create or edit command with designation of a detection rule name, a detection region as screen coordinates, and the PTZ preset token. The monitoring camera 100 receives the command at the communication unit 105, and causes the control unit 101 to create or edit the detection rule and update the detection rule setting table 500. The monitoring camera 100 also transmits the result of the detection rule create or edit command from the communication unit 105. The client device 120 receives the command result at the communication unit 126.

To delete a detection rule, the client device 120 transmits, from the communication unit 126, a detection rule delete command with designation of a rule name. Here, a command related to a detection rule and a command related to a PTZ preset can be issued independently of each other. Accordingly, the client device 120 can issue a detection rule delete command to the monitoring camera 100 regardless of whether or not the PTZ preset is associated with any detection rule. Upon receiving the aforementioned command at the communication unit 105, the monitoring camera 100 causes the control unit 101 to perform detection rule deletion processing 1301 corresponding to the present embodiment and update the detection rule setting table 500 and the PTZ preset setting table 510. Furthermore, the monitoring camera 100 transmits the result of the detection rule delete command from the communication unit 105. The client device 120 receives the command result at the communication unit 126.

Figure 13:
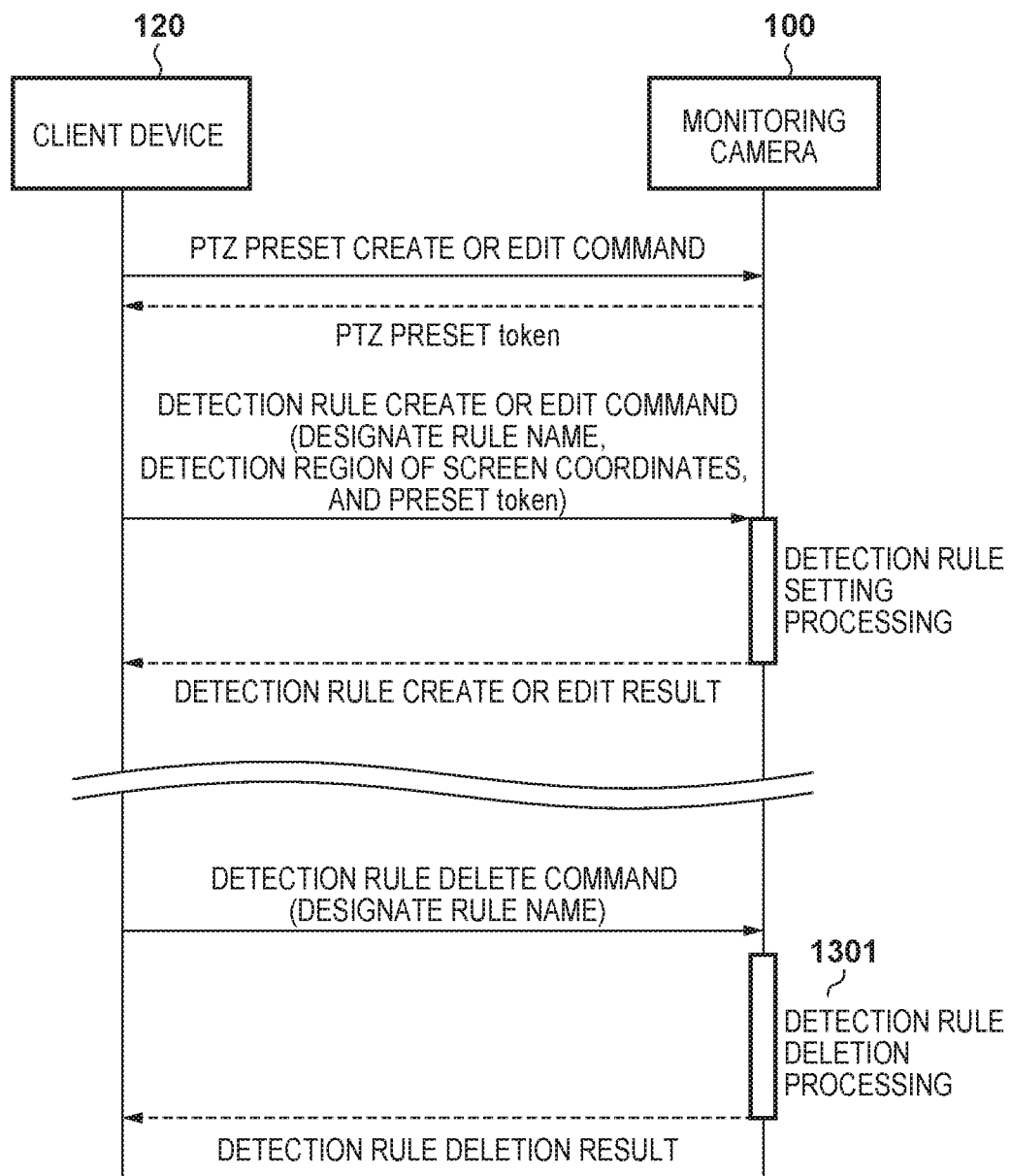
FIG. 13 is a sequence chart showing yet another example of communication and processing performed between the monitoring camera 100 and the client device 120 according to an embodiment.

In FIG. 13, the protocol of these commands may be, for example, the ONVIF, an original control protocol of the monitoring camera, or the like, and is not limited to being of a specific type.

Figure 14:
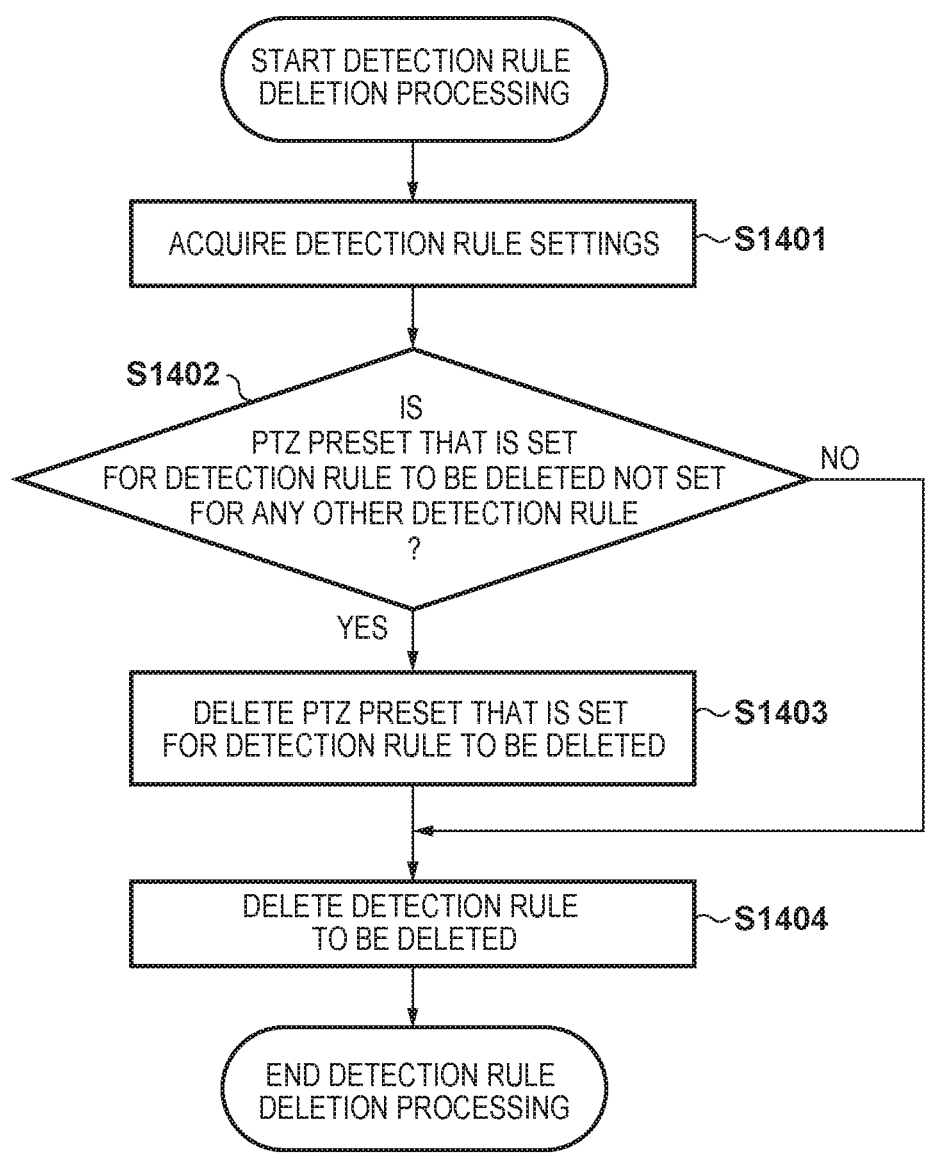
FIG. 14 is a flowchart showing an example of detection rule deletion processing performed by the monitoring camera 100 according to an embodiment.

The detection rule deletion processing 1301 performed by the monitoring camera 100 according to the present embodiment will be described with reference to FIG. 14. Firstly, in step S1401, the control unit 101 of the monitoring camera 100 acquires information regarding detection rule settings from the detection rule setting table 500 stored in the storage unit 102. In the following step S1402, the control unit 101 of the monitoring camera 100 determines whether or not the PTZ preset that is set for the detection rule to be deleted is set for any other detection rule; in other words, whether or not the PTZ preset is associated with any detection rule. If the PTZ preset is not associated with any other detection rule, the processing proceeds to step S1403. If the PTZ preset is associated with any other detection rule, the processing proceeds to step S1404.

In step S1403, the control unit 101 of the monitoring camera 100 updates the PTZ preset setting table 510 stored in the storage unit 102 so as to delete the PTZ preset associated with the detection rule to be deleted, and then, the processing proceeds to step S1404. In step S1404, the control unit 101 of the monitoring camera 100 deletes the detection rule to be deleted from the detection rule setting table 500 stored in the storage unit 102, and the processing ends.

As described above, in the present embodiment, when the monitoring camera 100 receives a detection rule delete command, it determines whether or not to delete the PTZ preset based on whether or not the PTZ preset that is associated with the detection rule to be deleted is also associated with any other detection rule. With this configuration, when a detection rule is deleted, a PTZ preset that is not set for any other detection rule and is no longer needed can be deleted.

Sixth Embodiment

Next, a sixth embodiment of the invention will be described. The system configuration, the functional configuration, and the hardware configuration in the present embodiment are the same as those described in the first embodiment, and a description thereof is omitted accordingly.

A description will be given below, with reference to FIG. 15, of a sequence in which the monitoring camera 100 according to the present embodiment sends a detection rule create command and a detection rule delete command to the client device 120. To create or edit the detection rule, the client device 120 transmits, from the communication unit 126, a detection rule create or edit command with designation of a detection rule name and a detection region as screen coordinates. Upon receiving the command at the communication unit 105, the monitoring camera 100 causes the control unit 101 to perform detection rule setting processing 1501 and update the detection rule setting table 500. The details of the detection rule setting processing 1501 is the same as the content of the detection rule setting processing 801 described with reference to FIG. 9 in the second embodiment, and a description thereof is omitted accordingly. Furthermore, the monitoring camera 100 transmits the result of the detection rule create or edit command from the communication unit 105. The client device 120 receives the command result at the communication unit 126.

To delete a detection rule, the client device 120 transmits, from the communication unit 126, a detection rule delete command with designation of the rule name. Upon receiving the command at the communication unit 105, the monitoring camera 100 causes the control unit 101 to perform detection rule deletion processing 1502 and update the detection rule setting table 500 and the PTZ preset setting table 510. Furthermore, the monitoring camera 100 transmits the result of the detection rule delete command from the communication unit 105. The client device 120 receives the command result at the communication unit 126.

Figure 15:
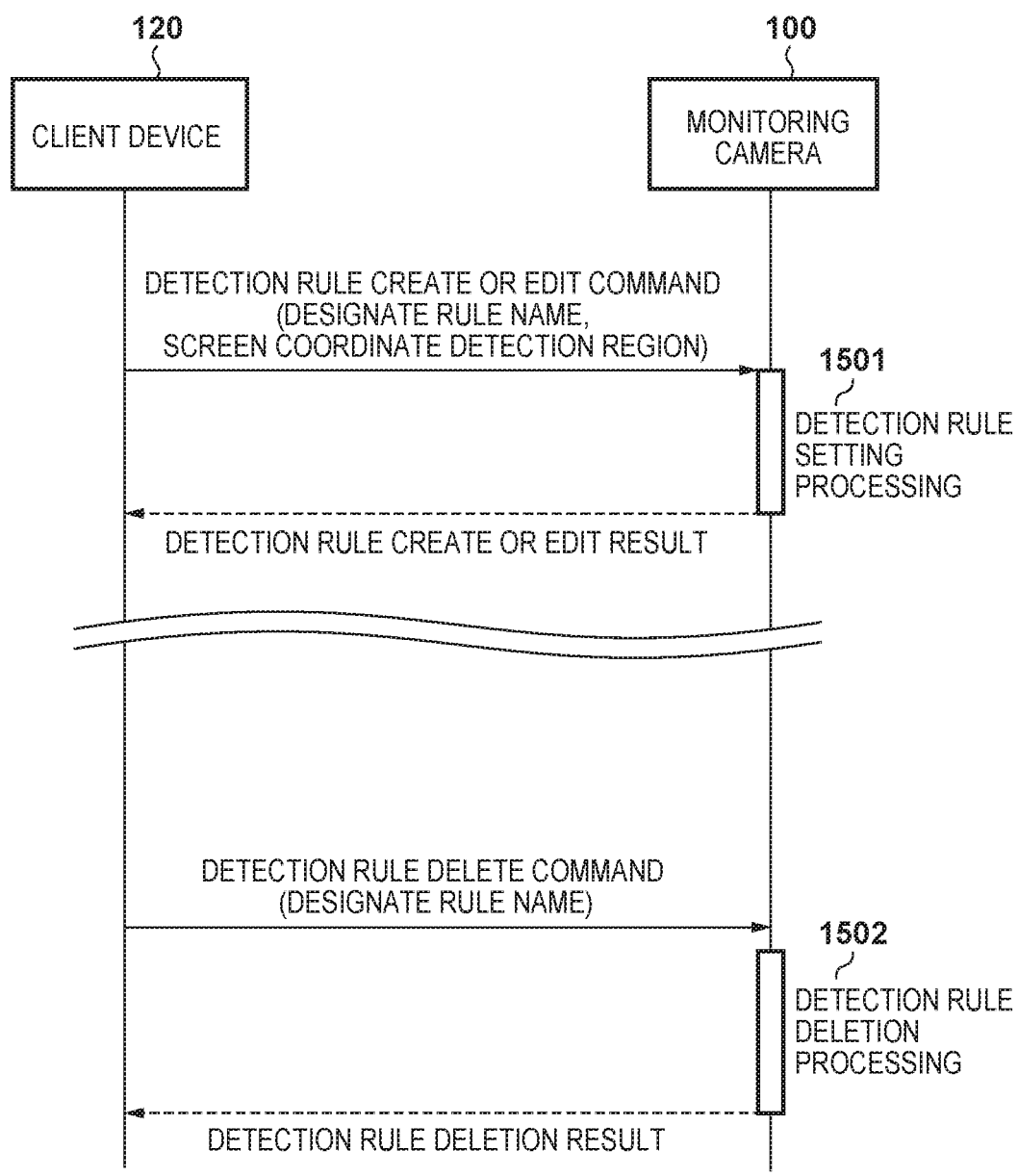
FIG. 15 is a sequence chart showing yet another example of communication and processing performed between the monitoring camera 100 and the client device 120 according to an embodiment.

In FIG. 15, the protocol of these commands may be, for example, the ONVIF, an original control protocol of the monitoring camera, or the like, and is not limited to being of a specific type.

Figure 16:
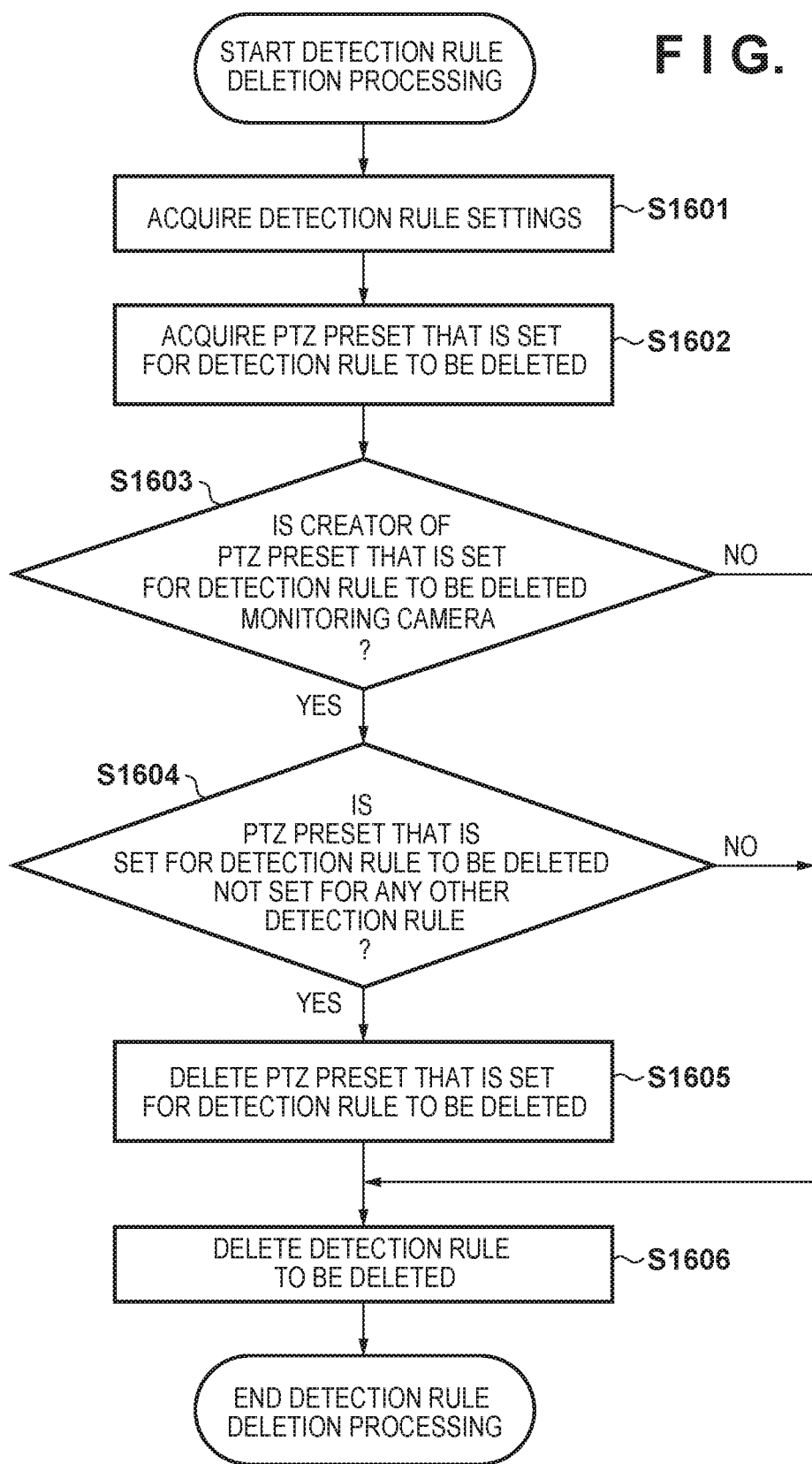
FIG. 16 is a flowchart showing an example of detection rule deletion processing performed. by the monitoring camera 100 according to an embodiment.

The detection rule deletion processing 1502 performed by the monitoring camera 100 according to the present embodiment will be described with reference to FIG. 16. In step S1601, the control unit 101 of the monitoring camera 100 acquires information regarding detection rule settings from the detection rule setting table 500 stored in the storage unit 102. In the following step S1602, the control unit 101 of the monitoring camera 100 acquires a PTZ preset that is set for the detection rule to be deleted, from the PTZ preset setting table 510 stored in the storage unit 102. In the following step S1603, the control unit 101 of the monitoring camera 100 determines whether or not the PTZ preset that is set for the detection rule to be deleted has been created by the monitoring camera 100, based on the creator set value of this PTZ preset. If the PTZ preset has been created by the monitoring camera 100, the processing proceeds to step S1604. If the PTZ preset has not been created by the monitoring camera 100, the processing proceeds to step S1606.

In step S1604, the control unit 101 of the monitoring camera 100 determines whether or not the PTZ preset that is set for the detection rule to be deleted is also set for any other detection rule, based on the set value of the detection rule in the PTZ preset setting table 510. If the PTZ preset is not set for any other detection rule, the processing proceeds to step S1605. If the PTZ preset is also set for any other detection rule, the processing proceeds to step S1606.

In step S1605, the control unit 101 of the monitoring camera 100 deletes the PTZ preset that is set for the detection rule to be deleted, from the PTZ preset setting table 510 stored in the storage unit 102, and the processing proceeds to step S1606. In step S1606, the control unit 101 of the monitoring camera 100 deletes the detection rule to be deleted from the detection rule setting table 500 stored in the storage unit 102, and the processing ends.

Note that a preset created by the monitoring camera 100 is created, in principle, in association with a detection rule, as described in relation to FIG. 9 in the second embodiment. Accordingly, a PTZ preset that is created by the monitoring camera 100 when creating a detection rule can be regarded as information that is not necessary for the user if the associated detection rule is not necessary and is to be deleted, unless the PTZ preset is associated with any other detection rule. For this reason, in the present embodiment, when a detection rule is deleted, the PTZ preset is deleted together. On the other hand, if the PTZ preset is associated with any other detection rule, or has been created in accordance with a creation instruction given by the user, the PTZ preset is regarded as information necessary for the user, and only the detection rule is deleted.

As described above, in the sixth embodiment, when the monitoring camera 100 receives a detection rule delete command, whether or not to delete a PTZ preset that is set for the detection rule to be deleted is determined based on whether or not the PTZ preset that is set for the detection rule to be deleted has been created by the monitoring camera 100, and whether or not the PTZ preset is set for any other detection rule. With this configuration, when a detection rule is deleted, a PTZ preset that is no longer needed can be deleted.

Other Embodiments

Embodiments of the present invention can also be realized by a computer of a system or apparatus that reads out and executes computer executable instructions (e.g., one or more programs) recorded on a storage medium (which may also be referred to more fully as a 'computer-readable storage medium') to perform the functions of one or more of the above-described embodiments and/or that includes one or more circuits (e.g., application specific integrated circuit (ASIC)) for performing the functions of one or more of the above-described embodiments, and by a method performed by the computer of the system or apparatus by, for example, reading out and executing the computer executable instructions from the storage medium to perform the functions of one or more of the above-described embodiments and/or controlling the one or more circuits to perform the functions of one or more of the above-described embodiments. The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-174539, filed on Sep. 25, 2019, which is hereby incorporated by reference herein in its entirety.

What is claimed is:

1. An image capture device comprising:
an image capture unit;
an image-capture control unit configured to control pan, tilt, and zoom (PTZ) when an image is captured by the image capture unit;
a storage unit configured to store a set value of the PTZ for capturing an image of a predetermined region in an image-capture area of the image capture unit, and region information that specifies a detection region for detecting an object in a captured image;
a reception unit configured to receive a deletion instruction to delete the region information from an information processing device; and
a processing unit configured to, when the deletion instruction to delete the region information is received by the reception unit, delete, from the storage unit, the region information for which the deletion instruction has been received, and delete the set value from the storage unit if the set value associated with the region information for which the deletion instruction has been received is not associated with another region information.

2. The image capture device according to claim 1, wherein the set value includes:
a first set value created in accordance with an instruction to create the set value given from the information processing device; and
a second set value created in accordance with an instruction to create the region information given from the information processing device, and
the processing unit deletes the set value from the storage unit if the set value associated with the region information for which the deletion instruction has been received is not associated with the other region information and is the second set value.

3. The image capture device according to claim 2, wherein the processing unit does not delete the set value from the storage unit if the set value associated with the region information for which the deletion instruction has been received is also associated with the other region information or is the first set value.

4. The image capture device according to claim 1, wherein if the region information is associated with the set value, the image-capture control unit controls an image-capture condition of the PTZ in the image capture unit based on the set value, and the image capture unit outputs an image of a region designated by the region information, of captured images that are captured under the image-capture condition.

5. The image capture device according to claim 1, wherein the reception unit receives the deletion instruction to delete the region information, independently of a deletion instruction to delete the set value.

6. The image capture device according to claim 5, wherein the deletion instruction to delete the set value and the deletion instruction to delete the region information are based on an ONVIF command.

7. A system comprising:
an image capture device including:
an image capture unit;
an image-capture control unit configured to control pan, tilt, and zoom (PTZ) when an image is captured by the image capture unit;
a storage unit configured to store a set value of the PTZ for capturing an image of a predetermined region in an image-capture area of the image capture unit, and region information that specifies a detection region for detecting an object in a captured image;
a reception unit configured to receive a deletion instruction to delete the region information from an information processing device; and
a processing unit configured to, when the deletion instruction to delete the region information is received by the reception unit, delete, from the storage unit, the region information for which the deletion instruction has been received, and delete the set value from the storage unit if the set value associated with the region information for which the deletion instruction has been received is not associated with another region information; and
an information processing device that communicates with the image capture device, and gives instructions related to a setting of the PTZ and a setting of the detection region.

8. A method for controlling an image capture device that includes: an image capture unit; an image-capture control unit configured to control pan, tilt, and zoom (PTZ) when an image is captured by the image capture unit; a storage unit configured to store a set value of the PTZ for capturing an image of a predetermined region in an image-capture area of the image capture unit, and region information that specifies a detection region for detecting an object in a captured image; a processing unit; and an reception unit configured to receive a deletion instruction to delete the region information from an information processing device, the method comprising:
receiving the deletion instruction to delete the region information from the information processing device, by the reception unit;
deleting, from the storage unit, the region information for which the deletion instruction has been received, by the processing unit; and deleting the set value from the storage unit if the set value associated with the region information for which the deletion instruction has been received is not associated with another region information, by the processing unit.

9. A non-transitory computer-readable storage medium storing one or more programs including instructions that, when executed by a processor of an image capture device comprising: an image capture unit; an image-capture control unit configured to control pan, tilt, and zoom (PTZ) when an image is captured by the image capture unit; a storage unit configured to store a set value of the PTZ for capturing an image of a predetermined region in an image-capture area of the image capture unit, and region information that specifies a detection region for detecting an object in a captured image; and an reception unit configured to receive a deletion instruction to delete the region information from an information processing device, causes the processor to perform operations of:

deleting, from the storage unit, the region information for which the deletion instruction has been received, upon receiving the deletion instruction to delete the region information from the information processing device; and deleting the set value from the storage unit if the set value associated with the region information for which the deletion instruction has been received is not associated with another region information.

* * * * *